(12) United States Patent
Fink et al.

(10) Patent No.: US 9,465,965 B1
(45) Date of Patent: Oct. 11, 2016

(54) METHODS, SYSTEMS AND APPARATUSES FOR RADIO FREQUENCY IDENTIFICATION

(71) Applicant: The United States of America as represented by the Administrator of the National Aeronautics and Space, Washington, DC (US)

(72) Inventors: Patrick W. Fink, Missouri City, TX (US); Andrew W. Chu, Houston, TX (US); Gregory Y. Lin, Friendswood, TX (US); Timothy F. Kennedy, Houston, TX (US); Phong H. Ngo, Friendswood, TX (US); Dewey T. Brown, League City, TX (US); Diane Byerly, Seabrook, TX (US)

(73) Assignee: The United States of America as represented by the Administrator of the National Aeronautics and Space Adminstration, Washington, DC (US)

( * ) Notice: Subject to any disclaimer, the term of this patent is extended or adjusted under 35 U.S.C. 154(b) by 137 days.

(21) Appl. No.: 14/184,337

(22) Filed: Feb. 19, 2014

Related U.S. Application Data

(60) Provisional application No. 61/775,940, filed on Mar. 11, 2013.

(51) Int. Cl.
*G06K 7/10* (2006.01)

(52) U.S. Cl.
CPC ....... *G06K 7/10336* (2013.01); *G06K 7/10356* (2013.01)

(58) Field of Classification Search
None
See application file for complete search history.

(56) References Cited

U.S. PATENT DOCUMENTS

| | | | |
|---|---|---|---|
| 5,565,846 A | 10/1996 | Geiszler et al. | |
| 6,104,291 A | 8/2000 | Beauvillier et al. | |
| 6,169,483 B1 | 1/2001 | Ghaffari et al. | |
| 6,759,959 B2 | 7/2004 | Wildman | |
| 6,788,205 B1 | 9/2004 | Mason et al. | |
| 6,967,579 B1 | 11/2005 | Elizondo | |
| 7,541,933 B2 | 6/2009 | Volpi et al. | |
| 7,626,505 B2 | 12/2009 | August et al. | |
| 7,689,481 B2 | 3/2010 | Seagle et al. | |
| RE43,699 E * | 10/2012 | Anderson | H01Q 1/366 343/701 |
| 9,208,362 B1 | 12/2015 | Fink et al. | |
| 2005/0133597 A1* | 6/2005 | Aoki | G06K 7/10336 235/451 |
| 2006/0002326 A1 | 1/2006 | Vesuna | |
| 2007/0001809 A1* | 1/2007 | Kodukula | G06K 7/0008 340/10.1 |
| 2008/0024300 A1 | 1/2008 | Fawcett et al. | |

(Continued)

FOREIGN PATENT DOCUMENTS

| | | |
|---|---|---|
| EP | 1701269 | 9/2006 |
| GB | 2416612 | 1/2006 |

(Continued)

*Primary Examiner* — Daniell L Negron
(74) *Attorney, Agent, or Firm* — Kurt G. Hammerle

(57) ABSTRACT

A system for radio frequency identification (RFID) includes an enclosure defining an interior region interior to the enclosure, and a feed for generating an electromagnetic field in the interior region in response to a signal received from an RFID reader via a radio frequency (RF) transmission line and, in response to the electromagnetic field, receiving a signal from an RFID sensor attached to an item in the interior region. The structure of the enclosure may be conductive and may include a metamaterial portion, an electromagnetically absorbing portion, or a wall extending in the interior region. Related apparatuses and methods for performing RFID are provided.

20 Claims, 27 Drawing Sheets

(56) References Cited

U.S. PATENT DOCUMENTS

| | | |
|---|---|---|
| 2008/0076536 A1 | 3/2008 | Shayesteh |
| 2008/0122615 A1 | 5/2008 | Shoenfeld |
| 2009/0251293 A1 | 10/2009 | Azevedo et al. |
| 2009/0251379 A1 | 10/2009 | Nikitin et al. |
| 2010/0050709 A1 | 3/2010 | Neville |
| 2010/0052911 A1 | 3/2010 | Matsen et al. |
| 2012/0306651 A1* | 12/2012 | Hall ............... G08B 13/19673 340/572.1 |
| 2012/0327502 A1* | 12/2012 | Zheludev ............... G02B 1/007 359/291 |
| 2013/0342320 A1* | 12/2013 | Hinman ........... G06K 19/07327 340/10.1 |

FOREIGN PATENT DOCUMENTS

| | | |
|---|---|---|
| JP | 2001024547 | 1/2001 |
| WO | WO2006/093992 | 9/2006 |
| WO | WO2007/090469 | 8/2007 |
| WO | WO2008/103820 | 8/2008 |

\* cited by examiner

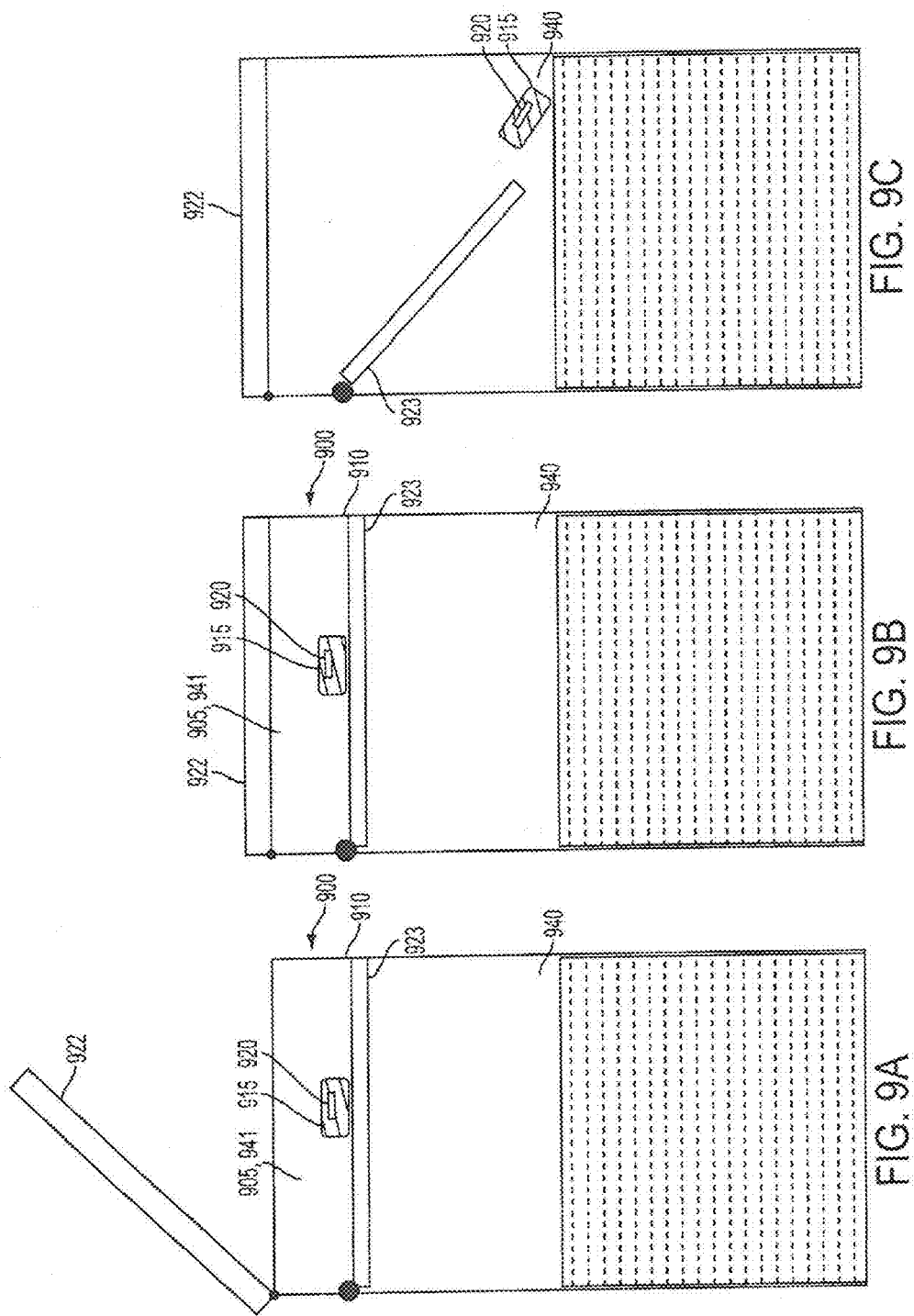

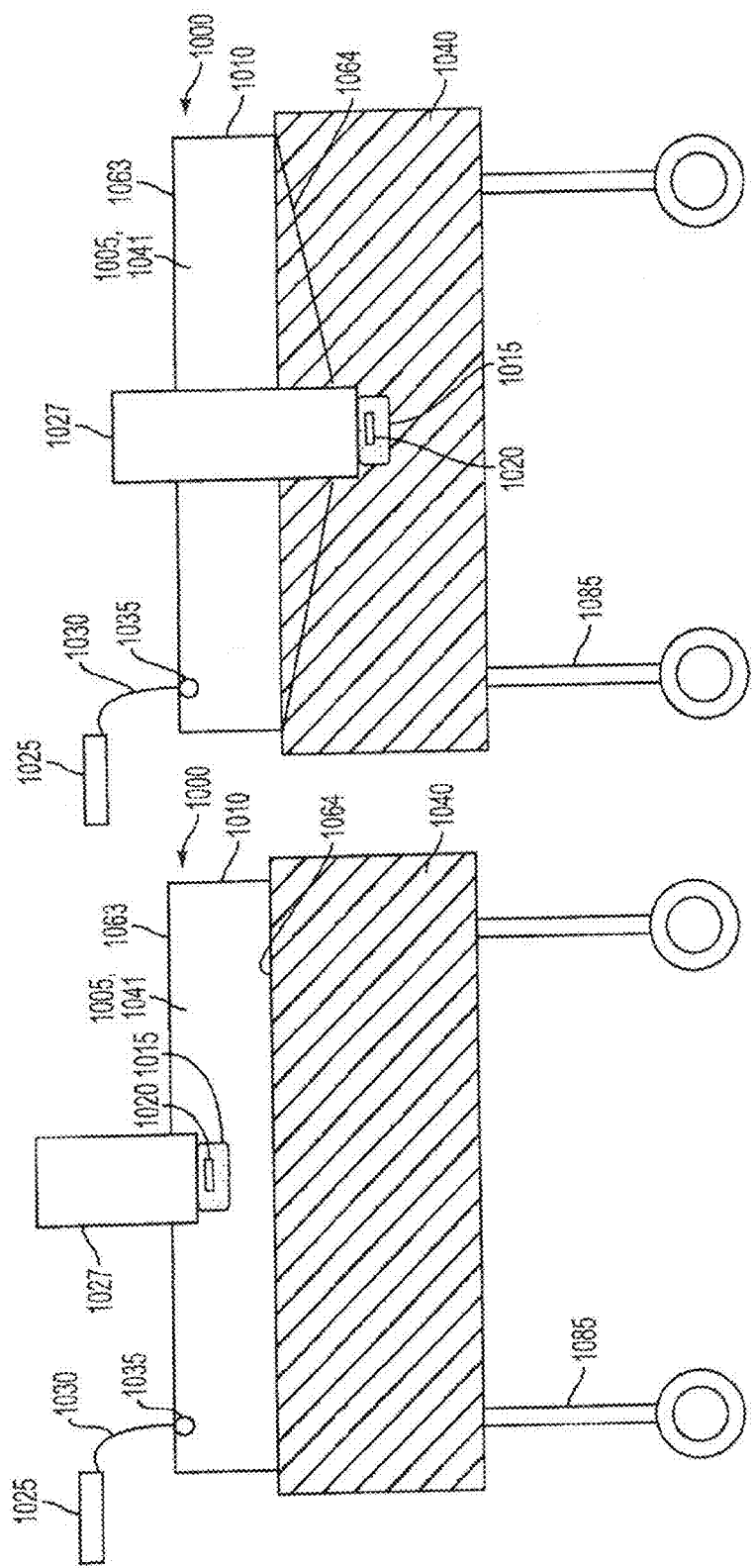

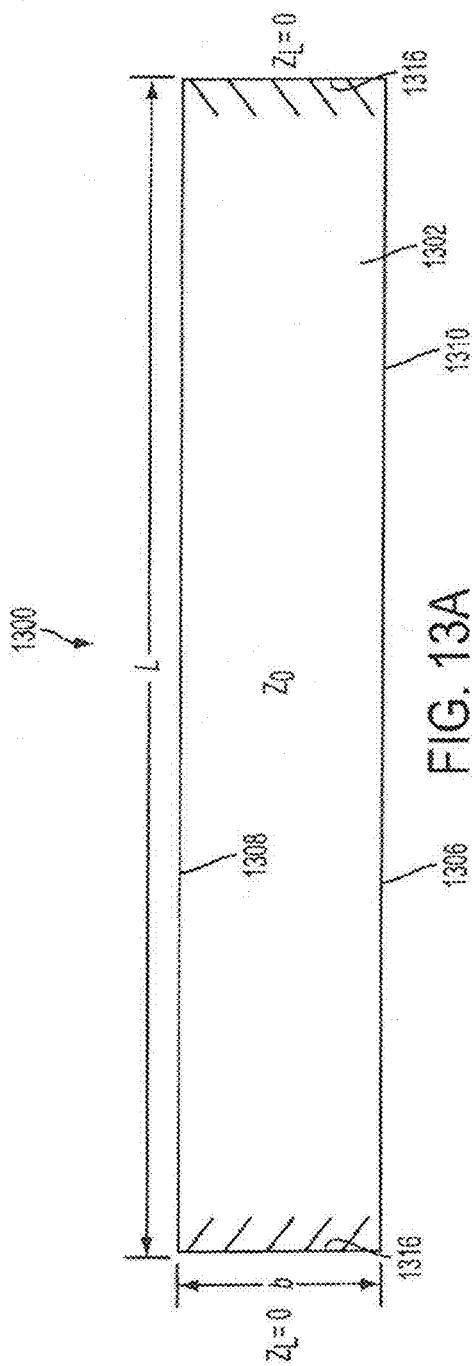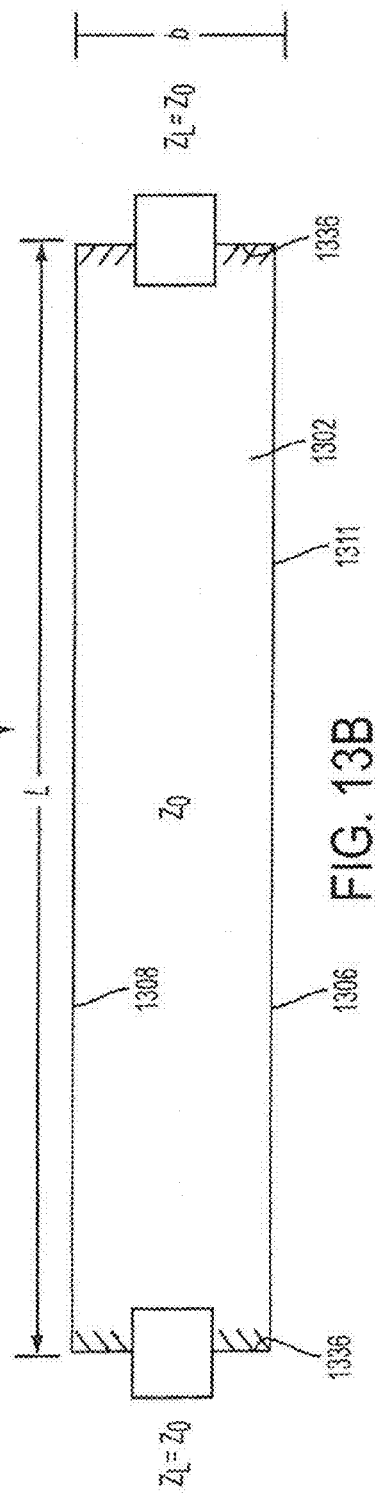
FIG. 13A
FIG. 13B

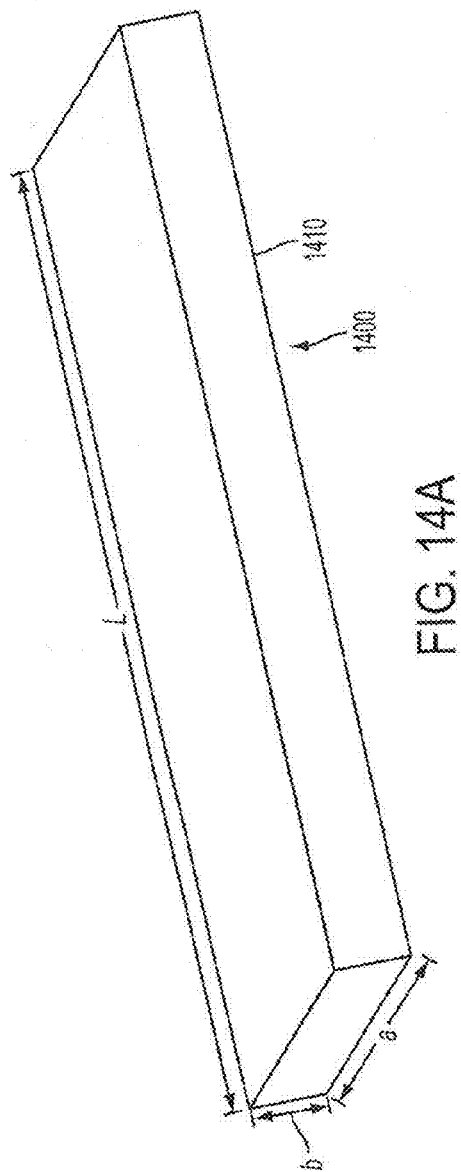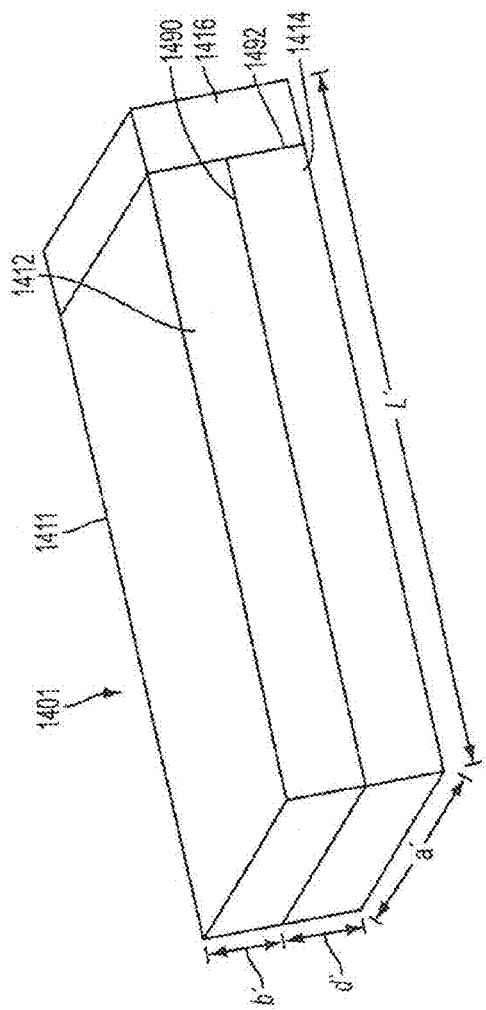
FIG. 14A
FIG. 14B

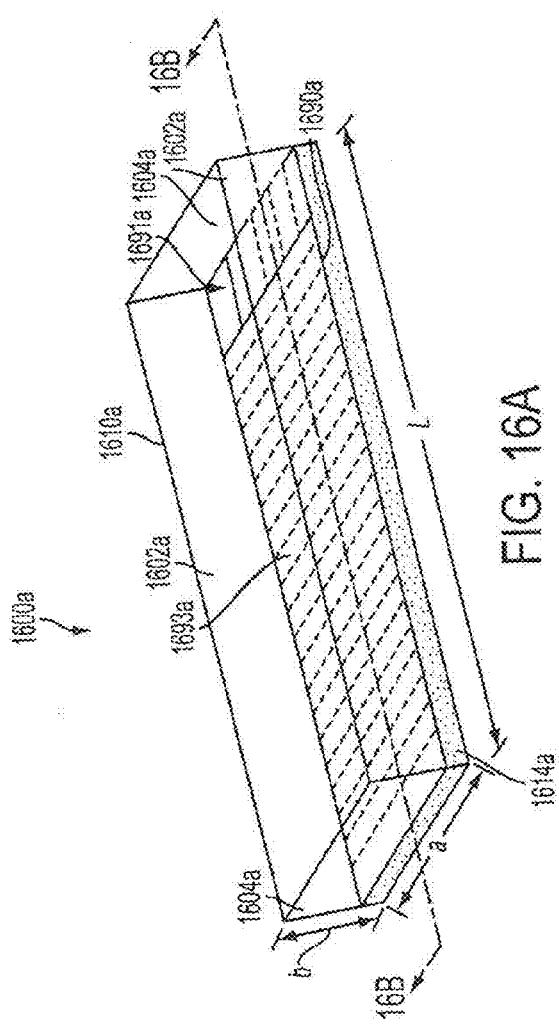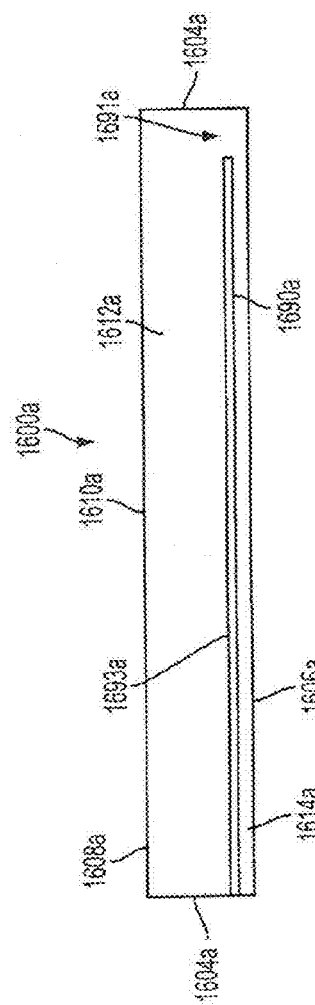
FIG. 16A
FIG. 16B

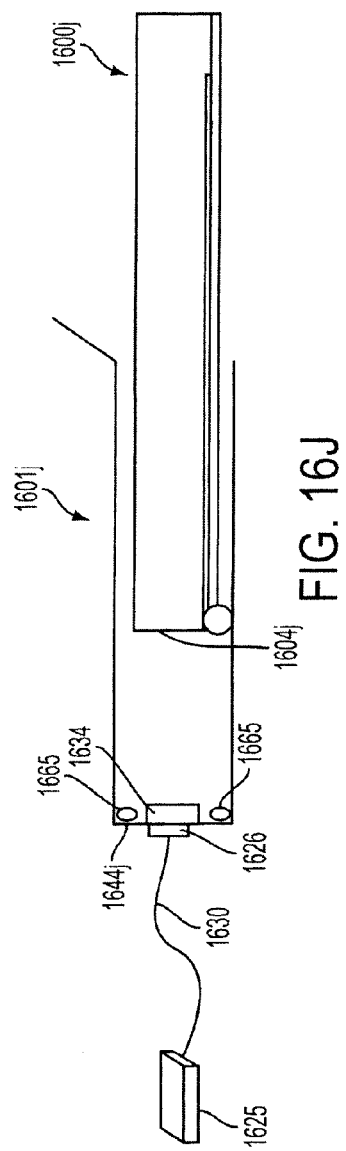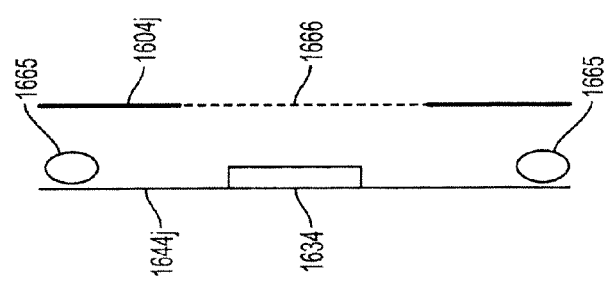

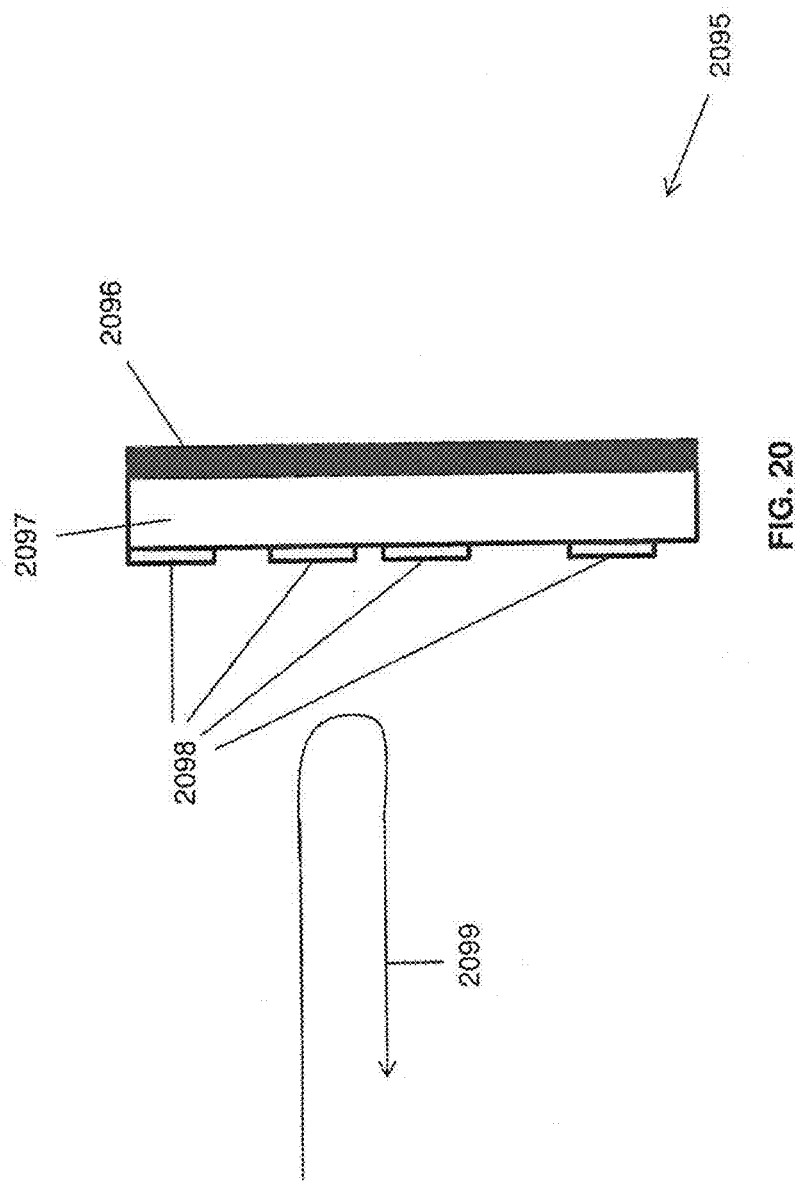

METHODS, SYSTEMS AND APPARATUSES FOR RADIO FREQUENCY IDENTIFICATION

CROSS-REFERENCE TO RELATED APPLICATIONS

This application claims the benefit of the filing date of U.S. provisional patent application No. 61/775,940, filed on Mar. 11, 2013.

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

The present disclosure relates generally to radio frequency identification ("RFID") systems, methods, and apparatuses. More particularly, the invention relates to improved RFID for detecting objects, using enclosures and feeds.

BACKGROUND OF THE INVENTION

Radio frequency identification (RFID) technology may be used to detect the presence of objects (identification, tracking, etc.). For example, an RFID reader or interrogator, in conjunction with an RF transmission line and an antenna or other conductor, may transmit a signal to generate an electromagnetic field. In response to the electromagnetic field, an RFID tag or sensor attached to an item transmits a signal, which is received by the antenna or conductor. This response signal may contain information identifying the particular RFID tag as well as information identifying/pertaining to the item to which it is attached. This information may be decoded by the reader or interrogator, or by a processor associated therewith.

SUMMARY

Embodiments of the present invention described herein provide systems, methods, and apparatuses for Radio Frequency Identification (RFID).

According to a first aspect of an embodiment described herein, a radio frequency identification (RFID) system comprises: an enclosure comprising an at least partly closed structure defining a boundary between an interior region, interior to the structure, and a region exterior of the structure, the structure having an inner surface facing the interior region and an outer surface facing the exterior; and at least one feed configured for (1) generating an electromagnetic field in the interior region in response to a first signal received from an RFID reader via at least one radio frequency (RF) transmission line, and (2) receiving, from at least one RFID sensor located in the interior region, a second signal generated in response to the electromagnetic field. At least a part of the outer surface is conductive, or at least a portion of the inner surface is conductive. At least a portion of the structure is formed of a metamaterial.

According to a second aspect of an embodiment herein, an RFID system comprises: an enclosure comprising an at least partly closed structure defining a boundary between an interior region, interior to the structure, and an exterior of the structure, the structure having an inner surface facing the interior region and an outer surface facing the exterior; and at least one feed configured for (1) generating an electromagnetic field in the interior region in response to a first signal received from an RFID reader via at least one radio frequency (RF) transmission line, and (2) receiving, from at least one RFID sensor located in the interior region, a second signal generated in response to the electromagnetic field. At least a part of the outer surface is conductive, or at least a portion of the inner surface is conductive. At least a portion of the structure is formed of an electromagnetically absorbing material.

According to a third aspect of an embodiment herein, an RFID system comprises: an enclosure comprising an at least partly closed structure defining a boundary between an interior region, interior to the structure, and an exterior of the structure, the structure having an inner surface facing the interior region and an outer surface facing the exterior; and at least one feed configured for (1) generating an electromagnetic field in the interior region in response to a first signal received from an RFID reader via at least one radio frequency (RF) transmission line, and (2) receiving, from at least one RFID sensor located in the interior region, a second signal generated in response to the electromagnetic field. At least a part of the outer surface is conductive, or at least a portion of the inner surface is conductive. The structure includes a wall extending within the interior region.

According to a fourth aspect of an embodiment herein, an RFID system comprises: an enclosure comprising an at least partly closed structure defining a boundary between an interior region, interior to the structure, and an exterior of the structure, the structure having an inner surface facing the interior region and an outer surface facing away from the interior region, and the interior region comprising an interrogation region for interrogation of an RFID sensor attached to an item within the interrogation region; a collection region for receiving the item from the interrogation region, after the RFID sensor attached to the item has been interrogated; and at least one feed configured for (1) generating an electromagnetic field in the interrogation region in response to a first signal received from an RFID reader via at least one radio frequency (RF) transmission line, and (2) receiving, from the RFID sensor attached to the item within the interrogation region, a second signal generated in response to the electromagnetic field. The structure includes a partition defining a boundary between the interrogation region and an exterior of the interrogation region, at least a portion of the partition being displaceable so as to permit the item to be transferred between the interrogation region and the collection region. At least a portion of the outer surface of the structure is conductive, or at least a portion of the inner surface is conductive.

According to a fifth aspect of an embodiment described herein, an RFID method comprises the steps of: (a) providing an enclosure, the enclosure comprising an at least partly closed structure defining a boundary between an interior region, interior to the structure, and a region exterior to the structure, the structure having an inner surface facing the interior region and an outer surface facing the exterior, (b) generating, by at least one feed, an electromagnetic field in the interior region in response to a first signal received from an RFID reader via at least one radio frequency (RF) transmission line; and (c) receiving, by the at least one feed, a second signal generated in response to the electromagnetic field by at least one RFID sensor located in the interior region. At least a part of the outer surface of the structure is conductive. At least a portion of the structure is formed of a metamaterial.

According to a sixth aspect of an embodiment herein, an RFID method comprises: (a) providing an enclosure, the enclosure comprising an at least partly closed structure defining a boundary between an interior region, interior to the structure, and an exterior of the structure, the structure having an inner surface facing the interior region and an outer surface facing the exterior; (b) generating, by at least one feed, an electromagnetic field in the interior region in response to a first signal received from an RFID reader via at least one radio frequency (RF) transmission line; and (c) receiving, by the at least one feed, a second signal generated in response to the electromagnetic field by at least one RFID sensor located in the interior region. At least a part of the outer surface of the structure is conductive, or at least a part of the inner surface of the structure is conductive. At least a portion of the structure is formed of an electromagnetically absorbing material.

According to a seventh aspect of an embodiment described herein, an RFID method comprises: (a) providing an enclosure, the enclosure comprising an at least partly closed structure defining a boundary between an interior region, interior to the structure, and an exterior of the structure, the structure having an inner surface facing the interior region and an outer surface facing the exterior; (b) generating, by at least one feed, an electromagnetic field in the interior region in response to a first signal received from an RFID reader via at least one radio frequency (RF) transmission line; and (c) receiving, by the at least one feed, a second signal generated in response to the electromagnetic field by at least one RFID sensor located in the interior region. At least a part of the outer surface of the structure is conductive, or at least a part of the inner surface of the structure is conductive. The structure includes a wall extending within the interior region.

According to an eighth aspect of an embodiment described herein, an RFID method comprises the steps of: (a) providing an enclosure, the enclosure comprising a partly or at least substantially closed structure defining a boundary between an interior region, interior to the structure, and an exterior of the structure, the structure having an inner surface facing the interior region and an outer surface facing the exterior, at least a portion of the outer surface being conductive, the interior region comprising an interrogation region for interrogation of an RFID sensor attached to an item to be positioned within the interrogation region, the structure including a partition defining a boundary between the interrogation region and an exterior of the interrogation region, at least a portion of the partition being displaceable so as to permit the item to be transferred from the interrogation region to a collection region, the collection region being for receiving the item from the interrogation region, after the RFID sensor attached to the item has been interrogated; (b) generating, by at least one feed, an electromagnetic field in the interrogation region in response to a first signal received from an RFID reader via at least one radio frequency (RF) transmission line; (c) receiving, by the at least one feed, a second signal generated in response to the electromagnetic field by the RFID sensor attached to the item when located within the interrogation region; (d) displacing the displaceable portion of the partition; and (e) receiving the item in the collection region from the interrogation region, after the RFID sensor attached to the item has been interrogated.

Other aspects and advantages of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIGS. 9A, 9B and 9C are schematic diagrams of an RFID system including, inter alia, separate interrogation and collection chambers in a first arrangement, in accordance with one or more embodiments of the present disclosure;

FIGS. 10A and 10B are schematic diagrams of an RFID system including, inter alia, separate interrogation and collection chambers in a second arrangement, in accordance with one or more embodiments of the present disclosure;

FIGS. 13A and 13B illustrate waveguides with reflecting and absorbing boundary conditions at their ends, respectively, in accordance with one or more embodiments of the present disclosure;

FIGS. 14A and 14B depict a first example of folding of an enclosure, in accordance with one or more embodiments of the present disclosure;

FIGS. 16A-16L depict various examples of folded enclosures, applicable to a drawer and cabinet arrangement, in accordance with one or more embodiments of the present disclosure;

FIGS. 17A-7D illustrate graphs of impedance versus frequency (FIGS. 17A and 17C) and voltage standing wave ratio versus frequency (FIGS. 17B and 17D), for signals received from RFID sensors, in accordance with one or more embodiments of the present disclosure;

FIG. 20 is a schematic diagram of a metamaterial structure or wall, in accordance with one or more embodiments of the present disclosure.

NOTATION AND NOMENCLATURE

Figure 1:
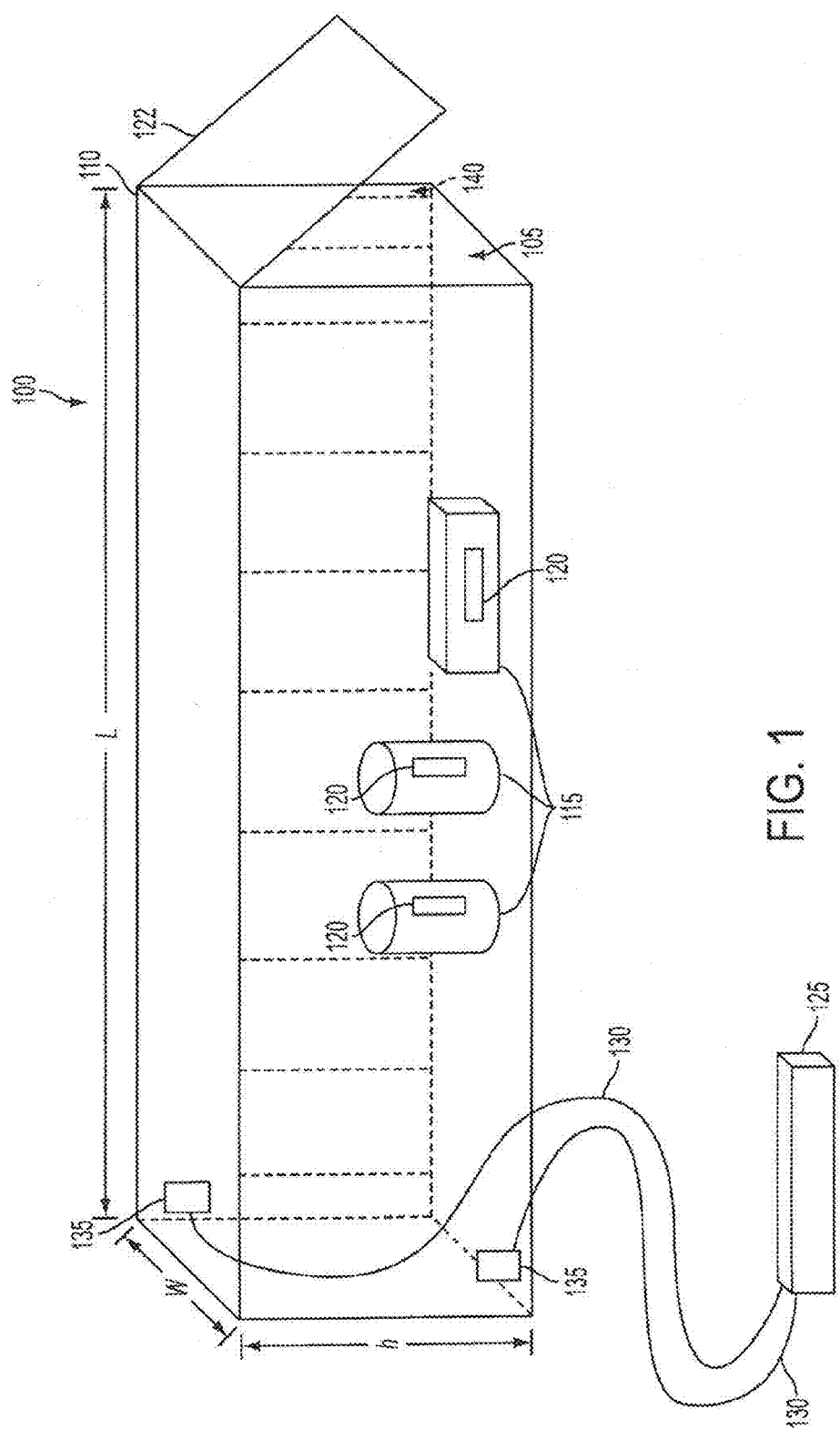
FIG. 1 is a schematic diagram of an RFID system including, inter alia, an enclosure with a metamaterial portion, which may function as a cavity, in accordance with one or more embodiments of the present disclosure.

Certain terms used throughout the following description and appended claims refer to particular system components and configurations. As one skilled in the art might appreciate, the same component may be referred to by different names, but may perform the same function. In the following discussion and in the claims, the terms "including" and "comprising" are used in an open-ended fashion, and thus should be interpreted to mean "including, but not limited to."

DETAILED DESCRIPTION

The figures are not necessarily drawn to scale and certain features may be shown exaggerated in scale or in somewhat generalized or schematic form in the interest of clarity and conciseness. The foregoing description of the figures is provided for a more complete understanding of the drawings. It should be understood, however, that the embodiments are not limited to the precise arrangements and configurations shown. Although the design and use of various embodiments are discussed in detail below, it should be appreciated that the embodiments described herein provide many inventive concepts that may be embodied in a wide variety of contexts. The specific aspects and embodiments discussed herein are merely illustrative of ways to make and use the invention, and do not limit the scope of the invention. It would be impossible or impractical to include all of the possible embodiments and contexts of the invention in this disclosure. Upon reading and benefit of this disclosure, many alternative embodiments of the present invention will become apparent to persons of ordinary skill in the art.

Before describing various specific implementations, a more general, high level description of the embodiments herein, which address the field of reading RFID tags on individual items, metal items, and electromagnetically lossy items, will be given. These embodiments may also provide other benefits. As these embodiments may be subject to further areas of improvement, secondary embodiments addressing such further areas of improvement will also be described.

One embodiment described herein is to place the items to be identified in an enclosure, which is preferably electromagnetically sealed or shielded, and perform the RFID interrogation on the items when located in the enclosure. By using an enclosure, a higher electromagnetic field strength and a more pervasive electromagnetic field may be attained in the area where interrogation of items is proposed to occur, when compared to interrogation in a free or non-enclosed space.

Electromagnetic sealing or shielding of an enclosure may be achieved by making the walls of the enclosure conductive. The conductive structure may serve as an electromagnetic boundary and may effectively prevent or minimize the ability of an electromagnetic field to cross it. Thus, an electromagnetic field that is generated within the enclosure may be effectively confined within it, while an electromagnetic field that exists outside of the enclosure may be effectively prevented from entering the enclosure. By confining a generated electromagnetic field within the enclosure, a higher level and more pervasive electromagnetic field may be attained within the enclosure, as compared to an electromagnetic field typically achievable in free space. A more pervasive, higher field level within the area of interrogation may increase the likelihood that all RFID tags within the area of interrogation are successfully interrogated (i.e., all items are identified). Traditionally, inadequate field strength at the RFID tag or, correspondingly, inadequate threshold voltage at the RFID tag rectifier, has been an obstacle to achieving a near-100% read accuracy or success rate during interrogation.

In practice, the above-described confinement of the electromagnetic field within the enclosure and prevention of electromagnetic field from crossing the enclosure boundary may not be absolute or 100%, and for the purposes described herein, the electromagnetic sealing or shielding need not be absolute or 100% in order to achieve desired and useful results. Accordingly, for the purposes described herein, the enclosure may be a closed, substantially closed, or, in some cases, partly closed, structure, and the structure (or the outer surface thereof) may be partly or at least substantially entirely conductive. In other words, the enclosure may be an at least partly closed structure, and at least a part of the structure, or of the outer surface thereof, may be conductive, as will be described further below.) The enclosure may be configured so as not to permit significant levels of electromagnetic fields to penetrate through the structure, from inside to outside or vice versa.

It will be noted that, for purposes herein, electromagnetic sealing or shielding may also be achieved by using a structure such as a screen, the apertures of which are small relative to the wavelength of electromagnetic radiation used in the enclosure.

When the act of interrogation is performed within an enclosure, it is possible that RFID tags located outside of the enclosure could be read, with the result being that the corresponding items attached thereto are erroneously deemed to be items inside the enclosure. This risk may be mitigated or eliminated by the act of electromagnetically sealing or shielding the enclosure as described herein. That is, to the extent that the electromagnetic field generated within the enclosure is prevented from seeping outside the enclosure wherein interrogation is to occur, then the field would not be able to cause RFID tags located outside the enclosure to respond. Electromagnetic sealing or shielding may also prevent unwanted interference (caused by the field generated within the enclosure) with other electromagnetic fields located outside of the enclosure (e.g., fields that are unrelated to the RFID interrogation and may be being used by third parties).

Further discussion of different kinds of enclosures will be given herein.

In addition to performing RFID interrogation in an electromagnetically shielded enclosure (i.e., not in a free or open space), embodiments for reading RFID tags on individual items, metal items, and electromagnetically lossy items, as described herein, use a feed (rather than a conventional antenna) to generate the electromagnetic field within an enclosed region. Conventional antennas are typically designed to operate in free space by means of electromagnetic radiation. In contrast, a feed might operate by near-field coupling, generating an electromagnetic field that couples to the enclosure structure and to the region interior to it. In addition, a feed may allow more precise control with respect to impedance matching and field distribution within the enclosure. These characteristics of feeds may permit attaining electromagnetic fields within an enclosure that perform better for RFID interrogation as compared to fields generated by a conventional antenna. Feeds may also be constructed to be of smaller size than conventional antennas; thus feeds may take up a small amount of space so as to be less obtrusive than conventional antennas. In other words, size may matter when RFID interrogation is performed in an enclosure, particularly when the enclosure is relatively small. Feeds constructed to be of larger size than small feeds might also be useful, such as for exciting electromagnetic fields within an enclosure. Large feeds might be designed to resonate in situ in the enclosure environment, and are sometimes more robust than smaller feeds because they are more likely to couple into a set of electromagnetic modes, characteristic of the enclosure structure, than a feed of smaller construction.

A feed may be, for example in one embodiment, a feed probe, a feed in the form of a closed shape, such as a feed loop, or a planar feed. Such a feed may be constructed, e.g., from a coaxial cable. In the case of a feed probe, the center (conducting) cable may protrude into the interior of the enclosure, or extend to the opposite (or another) side (wall) of the enclosure. In the case of a closed shape feed, the cable may form a loop or other shape and be located near a wall of the enclosure. In the case of a planar feed, the cable may be split open into a planar configuration. As will be understood by one of ordinary skill in the art having the benefit of this detailed description, feeds may be formed in other manners, and the above examples are not to be taken as limiting. Multiple feeds may be used for a single enclosure at different locations around the enclosure and in different orientations to increase the likelihood of successfully reading all the RFID-tagged items which may be located inside the enclosure.

A third embodiment described herein uses an enclosure such as described above which includes an interrogation region and additionally a separate collection region (which need not be part of the enclosure), such that the RFID-tagged item may be interrogated in the interrogation region and subsequently received or collected in the collection region. In this embodiment, difficulties posed by dense packing of individual items may be reduced, by placing one item (or a small number of items) at a time in the interrogation region, performing the interrogation on the item(s) in the interrogation region, and then removing the interrogated items to the collection region, and iterating the process.

A fourth embodiment described herein uses a conveyor belt in conjunction with an enclosure such as described above, the conveyor belt conveying items into and out of the enclosure where interrogation occurs. In this embodiment, difficulties posed by dense packing of individual items may be reduced, by conveying one item (or a small number of items) at a time into the enclosure, performing the interrogation on the item(s) in the enclosure, and then conveying the interrogated items out of the enclosure, and iterating the process.

The above-described characteristic of the enclosure having conductive walls presents another embodiment. Most common materials with high conductivity (e.g., metals) may be treated as perfectly electrical conductors (PECs). The tangential component of an electric field vanishes along the surface of a PEC. This type of surface is said to provide a short circuit boundary condition. However, an RFID tag may require a significant electric field to operate properly, and hence may not function well when located next to a highly conductive surface, as the tag's antenna is effectively "shorted" by the conductive surface.

The absent or inadequate electric field at the conductive walls of the enclosure may be addressed by use of a metamaterial for some or all of the structure or walls of the enclosure, instead of ordinary conductive material. A metamaterial is a material that is not found in nature, but is artificially synthesized in such a manner as to have properties not ordinarily found in natural materials. For example, a metamaterial can be made that approximates a perfectly magnetic conductor (PMC). In contrast to a PEC, an electric field does not vanish at a PMC. A PMC may be referred to as an open circuit boundary condition. Accordingly, by using such a metamaterial for a portion of the structure of the enclosure, the inner surface of that portion of the enclosure may be rendered non-conductive, while the outer surface of that portion of the enclosure is conductive. That is, the metamaterial may be constructed in such a manner as to have an inner PMC-like layer and an outer conductive layer. An example of a metamaterial structure or wall 2095 is shown schematically in FIG. 20. Metamaterial structure 2095 may include three layers, an outer conductive layer 2096, a middle insulating layer 2097, and an inner printed pattern 2098. Outer conductive layer 2096 may be, e.g., a metallic conductor, which may be treated as a PEC, and may be disposed on the exterior side of the enclosure. (In FIG. 20, the exterior of the enclosure would be on the right side of metamaterial structure 2095.) Middle insulating layer 2097 may actually include one or more than one insulating layer. Inner printed pattern 2098 may cover a portion (as shown) or all of middle insulating layer 2097, and may be disposed on the interior side of the enclosure. (In FIG. 20, the interior of the enclosure would be on the left side of metamaterial structure 2095.) Metamaterial structure 2095 may but need not be provided with interconnecting vias from printed pattern 2098 to conductive layer 2096. Upon generation of an electromagnetic field inside the enclosure, an electromagnetic wave 2099 may travel to the wall of the enclosure formed in part by metamaterial structure 2095 and be reflected back by the same. FIG. 20 and this description thereof represent non-limiting examples of metamaterial structures. Using an enclosure with such a metamaterial construction, the RFID tag is permitted to operate well inside the enclosure near the metamaterial portion, while the electromagnetic shielding and attendant benefits (preventing electromagnetic fields from passing between exterior and interior of the enclosure) are retained. Metamaterials may also be used to address other areas for improvement and provide other benefits, as will be discussed below.

The absent or inadequate electric field at the conductive walls of the enclosure may be addressed by use of a physical barrier, e.g., wall or partition, which may block RFID-tagged items from approaching too close to the conductive walls of the enclosure.

The above-described characteristic of the enclosure having conductive walls presents yet another embodiment. It will be noted that the above-described conductive enclosure may (but need not) be a cavity resonator. Generating an electromagnetic field in such an enclosure may result in a standing wave, as the wave emitted from the feed at one end of the enclosure is reflected back from the other end of the enclosure. The standing wave corresponds to one of an infinite set of discrete electromagnetic resonances, or modes, of the cavity. The modes are a function of the frequency of operation (frequency of the standing wave), the geometry of the enclosure and any items within it, and the characteristics and placement of the feed(s) introducing the signal into the enclosure. When the frequency is sufficiently removed from one of the resonances, the enclosure may not function as well in establishing an electromagnetic field distribution that supports successful interrogation of RFID tags.

A further issue with regard to standing waves is that a standing wave is characterized by having null and peak regions. At a null region, the field strength is null. If RFID tags that couple well with electric fields enter regions of low or null electric fields, this condition may excessively decrease the rate of successful interrogation. If RFID tags that couple well with magnetic fields enter regions of low or null magnetic fields, this condition may excessively decrease the rate of successful interrogation.

Finally, with regard to standing waves, the wave reflections may be received by the RFID reader and interfere with the signals being sent to the reader by RFID tags, and accordingly may decrease the rate of successful interrogation.

These issues pertaining to standing waves (limitation to resonant frequencies; interference; null and low fields) may be addressed by modifying the enclosure so as to make it a waveguide that is effectively infinite in at least one dimension. One way in which to create such a waveguide is by establishing an absorbing boundary condition at one or both ends of the enclosure, with the absorbing loads being matched to the waveguide characteristic impedance over the band of operation. This condition can be achieved by placing electromagnetically absorbing material at one or both ends of the enclosure, or along the side walls or the top and bottom surfaces of the enclosure near the ends of the enclosure. Electromagnetically absorbing material may also be referred to as electromagnetically lossy material. A suitable, but not limiting, example of an electromagnetically absorbing material is a microwave absorbing material. A metamaterial may also be used to create an electromagnetically absorbing boundary condition. The absorbing material absorbs, or attenuates, the electromagnetic energy, thereby eliminating or minimizing reflection from one or both ends of the enclosure. If the wave is thus sufficiently attenuated before reaching the physical end of the enclosure, the reflected signal is effectively minimized or eliminated, and a propagating or traveling wave, rather than a standing wave, is established. The absence or minimization of the reflected signal eliminates or minimizes the problem of interference caused by such signal. The absence of the standing wave eliminates the null and peak regions; in contrast, a propagating wave maintains uniform amplitude in the direction of propagation. Finally, the waveguide supports continuous operation across the spectrum of operating frequencies so long as the operating frequency exceeds the cutoff frequency, eliminating the problem whereby operation was limited to specific resonant frequencies.

As an alternative to using an electromagnetically absorbing material to create an effectively infinite waveguide, a probe could be placed at the end(s) of the waveguide to couple the energy out. As a further alternative, one or both ends of the waveguide may be made sufficiently distant from the source of the electromagnetic energy that the energy is sufficiently attenuated upon reaching the end as to render the reflected energy insignificant. The waveguide could also be created with the one or both ends of the enclosure open to the exterior. In this case, the waveguide may include a portion formed of an electromagnetically absorbing material near the open end(s).

It will be noted that modifying the enclosure to render it an effectively infinite waveguide reduces the amount of electromagnetic energy in the enclosure during operation, due to the attenuation of the energy. Accordingly, it is also possible in another embodiment to create hybrid enclosures, part cavity and part waveguide, in which the electromagnetic energy is only partially absorbed at the end(s) of the enclosure.

The above-described enclosure having conductive walls, whether cavity or waveguide, presents another embodiment. The enclosure must have certain minimum dimensions (defined relative to the wavelength of electromagnetic energy used) to prevent the electromagnetic field from decaying exponentially away from the feed. This condition may dictate that the enclosure have dimensions larger than are otherwise useful or desired.

This issue of minimum enclosure dimensions may be addressed by using a metamaterial for a portion of the surface of the enclosure, in place of an ordinary conductive material. For example, a metamaterial may be used to synthesize an impedance boundary condition that is offset from the surface(s) of the enclosure. In the case of a cavity, such use of a metamaterial may permit certain cavity resonances to exist in an enclosure of smaller dimensions than would otherwise be possible. In the case of a waveguide, such use of a metamaterial may permit propagating modes (propagating waves at a particular frequency) with smaller dimensions than would otherwise be possible.

Another way in which the issue of minimum enclosure dimensions may be addressed is by "folding" an enclosure so that the enclosure has a folded configuration. In such a configuration, the extent of the enclosure along a given dimension may be physically decreased (by folding) while effectively held constant when considered with respect to an electromagnetic field or electromagnetic waves in the enclosure. Put another way, an enclosure of a given physical extent may be effectively extended along a given dimension, as far as an electromagnetic field or electromagnetic waves in the enclosure are concerned. Such folding may be achieved by use of an internal wall (a wall extending within the interior of the enclosure) or the like barrier which divides the interior of the enclosure along a given dimension into two separate subregions while providing for electromagnetic coupling of the two subregions to occur around the end of, or through, the barrier. (Folding and coupling is described further below with reference to FIGS. 14A-16L.)

As discussed above, for the purposes described herein, metamaterials may be used to achieve various conditions or structural properties of enclosures. Such conditions may be referred to in general as generalized impedance boundary conditions. Non-limiting examples of such conditions applicable for the purposes described herein include PMC-like conditions and electromagnetically absorbing or lossy conditions.

In view of the above discussion, the enclosures useful for purposes described herein include what may be referred to as cavities, waveguides and resonators.

Embodiments (systems, apparatuses, and methods) disclosed herein may operate in the UHF range, e.g., 850-950 MHz. However, this range is not to be taken as limiting, and frequencies could be used as low as at least about 10 MHz and as high as about 60 GHz or higher.

For the purposes described herein, the terms "RF cables," "RF transmission lines," and the like are intended to encompass the most general group of waveguiding apparatuses, including transverse electric (TE), transverse magnetic (TM), transverse electromagnetic (TEM) and hybrid TE-TM apparatuses. The terms are intended to refer to the transmission of electromagnetic fields between the RFID reader or interrogator and the antenna or feed, the art of which is well established, as contrasted with the transmission of fields from the antenna or feed to and within an enclosure filled with a large number of tagged items in various positions and orientations.

For the purposes described herein, the RFID sensor or tag may be, e.g., a passive RFID tag including an integrated circuit (IC) and antenna, or a Surface Acoustic Wave (SAW) RFID circuit, which uses a SAW piezoelectric crystal, associated circuitry, antenna, and the like instead of an IC.

Descriptions of various embodiments, including specific implementations, follow, with reference to the figures. It will be noted that in some cases aspects discussed above may be referred to in embodiments and arrangements described below without an accompanying description having the level of detail described above, it being understood that such limited descriptions below are intended as drawing on the detail described above as applicable and appropriate.

FIG. 1 depicts an RFID system including an enclosure 100, an RFID reader or interrogator 125, RF transmission lines 130, and feeds 135. Enclosure 100 may function as a cavity. In other embodiments, enclosure 100, appropriately modified, may function as a resonator or waveguide.

Enclosure 100 comprises a structure 110 defining a boundary between an interior region (or interior volume) 105 interior to structure 110 and the exterior of structure 110. Structure 110 may be at least substantially closed, as illustrated, or partly closed. Structure 110 has an inner surface facing interior region 105 and an outer surface facing the exterior. (The outer surface may also be described as facing away from interior region 105). While enclosure 100 or structure 110 is illustrated as a rectangular prism (box shape) having dimensions of length L, width w, and height h, enclosure 100 or structure 110 is not limited to such shape or dimensions. (L, w, h and other variables are used in this disclosure to represent dimensions. It is noted that although the same variables may be used in different figures, the same variables do not necessarily take on the same values in different figures.)

Enclosure 100 may be deemed a container for containing items. Although not illustrated, enclosure 100 may include a first portion that is a container and a second portion that is not a container (e.g., the second portion may not be a substantially closed structure). Structure 110 includes a displaceable portion 122, configured (1) for opening, so as to create an entry or opening between structure 110 and the exterior, and (2) for closing, so as to close the opening between structure 110 and the exterior. Items may be transferred between the exterior and the enclosure (container) via the opening. Displaceable portion 122 may comprise a door, lid or other kind of displaceable portion. Displaceable portion 122 may open and close in the manner of a hinged door or lid, as illustrated, or in another manner.

Structure 110 may be formed in such a manner that at least substantially all of the outer surface of structure 110 (including the outer surface of displaceable portion 122) is conductive, such that when displaceable portion 122 is closed, structure 110 is electromagnetically sealed or shielded with respect to the exterior. Such electromagnetic sealing or shielding of structure 110 may be at least substantially complete or may be incomplete, for example, where structure 110 is only partly closed. Structure 110 may also be formed in such a manner that part of the outer surface of structure 110 is conductive. Structure 110 may also be formed in such a manner that at least substantially all of the inner surface of structure 110 (including the inner surface of displaceable portion 122) is conductive, such that when displaceable portion 122 is closed, structure 110 is electromagnetically sealed or shielded with respect to the exterior. Such electromagnetic sealing or shielding of structure 110 may be at least substantially complete or may be incomplete, for example, where structure 110 is only partly closed. Structure 110 may also be formed in such a manner that part of the inner surface of structure 110 is conductive. Structure 110 may also be formed in such a manner that structure 110 substantially encloses interior region 105, when displaceable portion 122 is closed, with a conductive boundary formed by a combination of inner and outer surfaces of structure 110, either or both of which surfaces may be at least partly or at least substantially conductive. Thus, structure 110 may be at least partly or at least substantially conductive. However, it is not necessary that a part of the outer surface of structure 110 be conductive (to whatever extent) or that a part of the inner surface of structure 110 be conductive (to whatever extent).

Structure 110 may be formed in such a manner that at least a portion 140 thereof is formed of a metamaterial. While in FIG. 1 metamaterial portion 140 is a sidewall of structure 110, metamaterial portion 140 may form a different portion of structure 110, including a portion inside interior region 105, although no such portion is shown in FIG. 1. Although not illustrated, structure 110 may include a portion formed of an electromagnetically absorbing (or lossy) material, which may or may not be a metamaterial. Metamaterial portion 140 may be formed in such a manner as to prevent a short circuit boundary condition, to establish an open circuit boundary condition, or to establish a generalized impedance boundary condition, on a portion of the inner surface of structure 110.

RFID interrogator 125 may be connected to one or more RF transmission lines 130, each of which may terminate in a feed 135 attached to the structure 110. Each of feeds 135 may be a feed probe. In other embodiments, feeds 135 may be planar feeds or feeds in the form of a closed shape. The number of RF transmission lines 130 and feeds 135 may differ from that which is illustrated.

One or more items 115 may be placed in enclosure 100 for interrogation thereof. Accordingly, each item 115 may have an RFID sensor or tag 120 attached thereto. RFID tag 120 may include an integrated circuit or may be a SAW RFID sensor.

As mentioned, the geometry of enclosure 100 or structure 110 and any items 115 within it, the characteristics and placement of the feed(s) 135, and the frequency of operation determine the modes that may be excited in interior region 105.

In operation, items 115 may be placed inside interior region 105 via the opening created by displaceable portion 122. Displaceable portion 122 may then be closed. RFID interrogator 125 may then transmit a first signal to one or more of feeds 135 via RF transmission lines 130. In this regard, where multiple feeds 135 are used, RFID interrogator 125 may cycle through feeds 135, exciting feeds 135 sequentially, one at a time, or RFID interrogator 125 may transmit a signal to more than one feed 135 simultaneously. In response to the first signal received from RFID reader 125, feed(s) 135 may generate an electromagnetic field in interior region 105. In response to the generated electromagnetic field, RFID tags 120 may send a second signal to feed(s) 135. The second signal may contain information identifying the particular RFID sensor 120 that generated the second signal and may contain information pertaining to the item 115 to which the particular RFID sensor 120 is attached. With regard to information pertaining to the item 115 to which the particular RFID sensor 120 is attached, this information may be an identification code that indexes information regarding the tagged item 115. Feed(s) 135 may couple the second signal from RFID tags 120 to RFID reader 125 via RF transmission line(s) 130. The coupled second signal may also include the above-noted information of the item 115 or the RFID sensor 120, or both, contained in the second signal. The coupled second signal may be analyzed by a processor which, although not depicted, may also be a part of the RFID system. The processor may be in communication with RFID reader 125, and may or may not be housed together with RFID reader 125. Analysis of the coupled second signal may permit decoding of the signal so as to obtain the information contained therein. This information may permit identification of item 115, determination of whether item 115 is (was) in enclosure 100, etc.

In view of the above description of enclosure 100, enclosure 100 may be referred to as an RFID-enabled enclosure, an RFID-enabled cavity, or an RFID-enabled waveguide.

Figure 2:
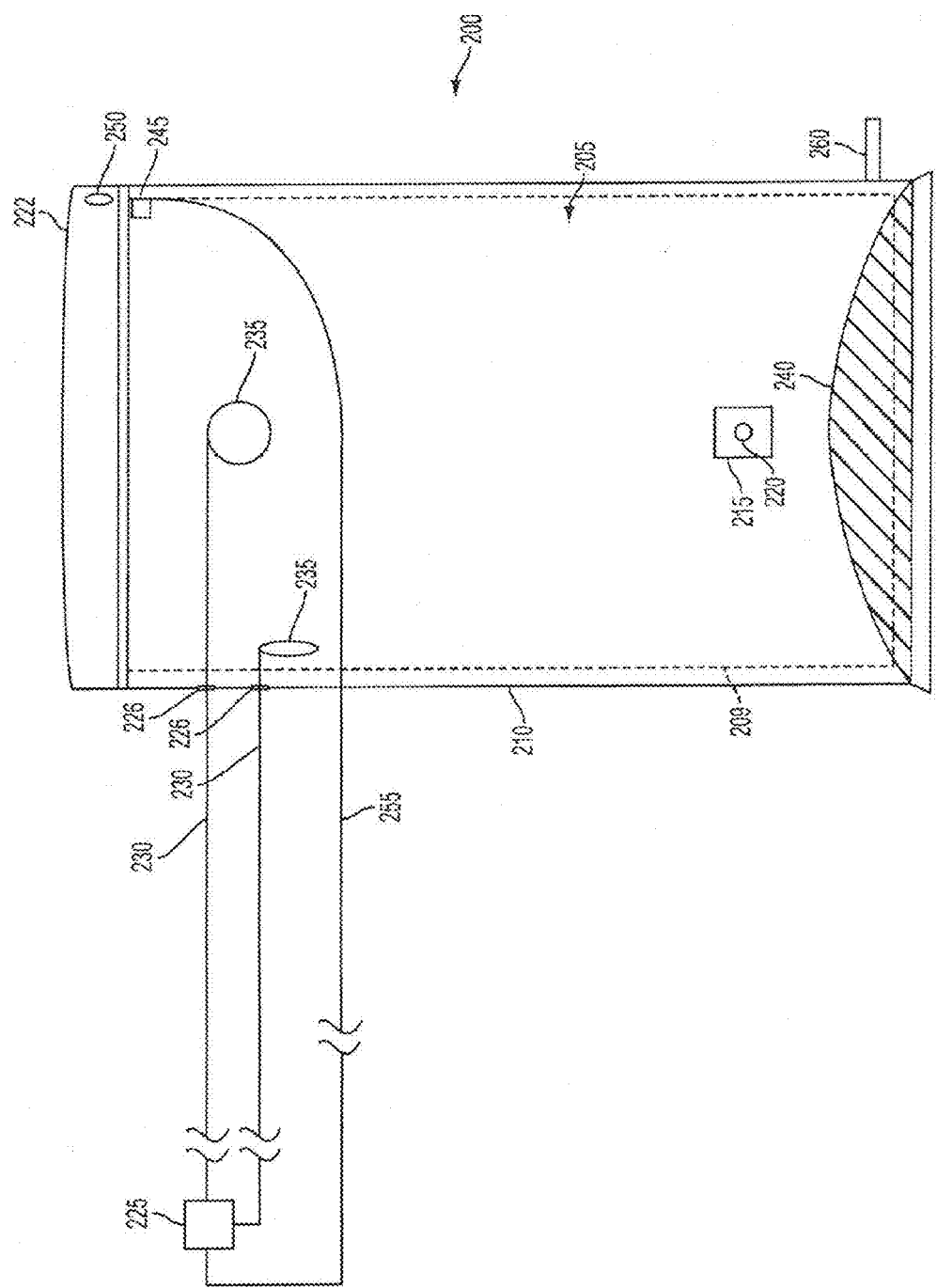
FIG. 2 is a schematic diagram of an RFID system including, inter alia, an enclosure in the form of a trash receptacle, which may function as a cavity, in accordance with one or more embodiments of the present disclosure.

FIG. 2 depicts an RFID system including an enclosure 200 in the form of a trash receptacle, an RFID reader or interrogator 225, RF transmission lines 230, and feeds 235. Enclosure 200 may function as a cavity. In other embodiments, enclosure 200, appropriately modified, may function as a resonator or waveguide.

Enclosure 200 comprises a structure 210 defining a boundary between an interior region or volume 205, interior to structure 210, and a volume exterior of structure 210. Structure 210 may be at least substantially closed, as illustrated, or partly closed. Structure 210 has an inner surface facing interior region 205 and an outer surface facing the exterior volume. While enclosure 200 or structure 210 is illustrated as a cylinder having a circular cross-section, enclosure 200 or structure 210 is not limited to such shape.

As with enclosure 100, enclosure 200 may be deemed a container for containing items and may include a displaceable portion 222, e.g., a lid. The description given above of enclosure 100 as a container and of displaceable portion 122 applies also to enclosure 200 and displaceable portion 222. Similarly, the description given above of structure 110 as having conductive outer and/or inner surfaces, either or both of which surfaces may be at least partly or at least substantially conductive, and of structure 110 being consequently (completely or incompletely) electromagnetically sealed or shielded applies also to structure 210. As with structure 110, it is not necessary that a part of the outer surface of structure 210 be conductive (to whatever extent) or that a part of the inner surface of structure 210 be conductive (to whatever extent). In some embodiments, lid 222 of enclosure 200 is not conductive. As with structure 110 having a metamaterial portion 140, structure 210 may include a metamaterial portion 240. In contrast to structure 110, where metamaterial portion 140 is illustrated in FIG. 1 as a sidewall thereof, in FIG. 2 metamaterial portion 240 is illustrated as being on the interior bottom surface of structure 210. However, metamaterial portion 240 may form a different portion of structure 210, e.g., a portion of a sidewall thereof, and the description given above of metamaterial portion 140 otherwise applies similarly to metamaterial 240. As one example of a particular use of metamaterial 240, metamaterial 240 may be formed as a PMC-like material to promote a PMC-like boundary condition on a portion of the inner surface of structure 210. Similar to structure 110, structure 210 may include a portion formed of an electromagnetically absorbing (or lossy) material, which may or may not be a metamaterial, although such portion is not illustrated in FIG. 2. By way of non-limiting example, such electromagnetically absorbing (or lossy) portion may be located on the interior bottom surface or on the interior of a side wall near the bottom surface. Such a portion may serve to reduce reflections from such surfaces.

As with RFID interrogator 125, RFID interrogator 225 may be connected to one or more RF transmission lines 230, each of which may enter interior region 205 through a bulkhead feedthrough 226 and may terminate in a feed 235 attached to structure 210. Each of feeds 235 may be a feed in the form of a closed shape, e.g., a feed loop (current loop) as illustrated, or another closed shape. In other embodiments, feeds loops 235 may be replaced by feed probes or planar feeds. The number of RF transmission lines 230 and feeds 235 may differ from that which is illustrated.

Figure 3:
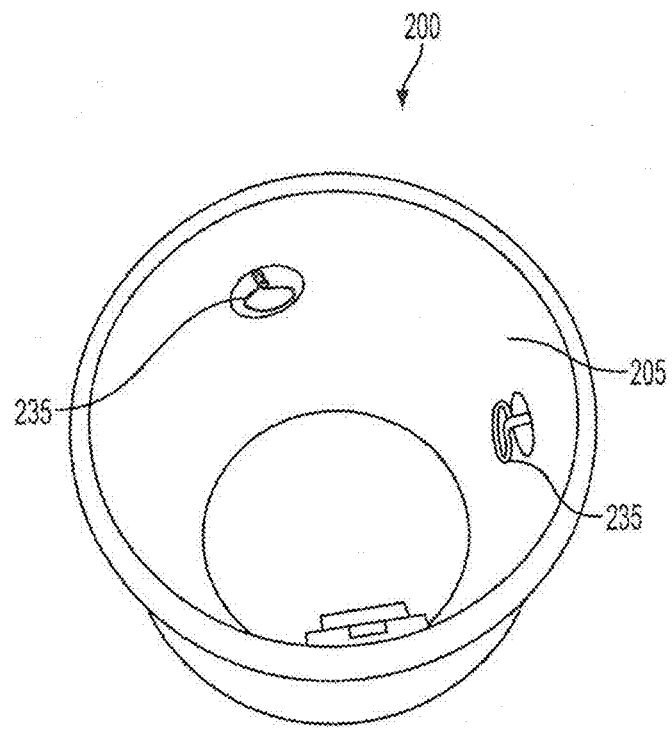
FIG. 3 is a schematic diagram illustrating an example of the positioning of feed loops in the enclosure of FIG. 2, in accordance with one or more embodiments of the present disclosure.

FIG. 3 is a view from above, looking down into enclosure 200 (with lid 222 not shown), and illustrates a non-limiting example of the positioning of two feed loops 235 in interior region 205. As seen in FIG. 3, two feed loops 235 are separated from one another by about 90 degrees of the circumference of interior region 205. This positioning may serve to improve distribution of the electromagnetic field within interior region 205.

Figure 4:
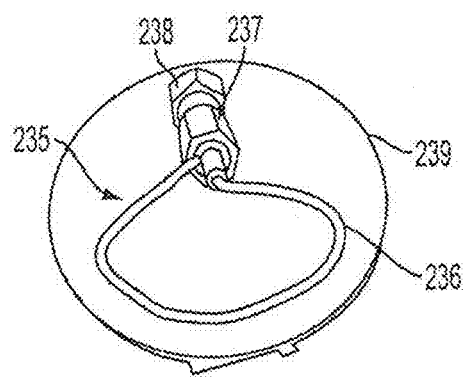
FIG. 4 is a schematic diagram providing a close-up view of a feed loop of FIG. 3, in accordance with one or more embodiments of the present disclosure.

FIG. 4 provides a close-up, or more detailed, illustration of a feed loop 235 shown in FIG. 3. As shown, feed loop 235 may include a loop of wire 236 attached to a probe 237, which in turn may be affixed to a fastener 238 that secures feed loop 235 to the interior of enclosure 200. Fastener 238 may be attached to bulkhead feedthrough 226 (FIG. 2), which passes through the sidewall of structure 210. An opening 239 in liner 209 (FIG. 2) permits passage of feed loop 235 through liner 209 (described below) into interior region 205.

Turning back to FIG. 2, RFID reader 225 may also be connected to a switch 245 over one or more wires 255. Switch 245 may be a magnetic reed switch or other kind of switch. Lid (displaceable portion) 222 may have one or more triggering devices 250 operable to cause switch 245 to close, that is, complete the circuit between switch 245 and RFID reader 225, when lid 222 is closed. Triggering devices 250 may be magnets or another kind of triggering device. The closing of switch 245 (or completing of the circuit) causes reader 225 to be switched on, so as to transmit a signal via one or more transmission lines 230 to one or more feeds 235, so as to cause feed(s) 235 to generate an electromagnetic field in enclosure 200.

The description given above of the operation of enclosure 100 applies also to the operation of enclosure 200. Thus, although not illustrated, the RFID system shown in FIG. 2 may similarly include a processor, as was described with respect to the RFID system shown in FIG. 1. The operation of enclosure 200 further includes the operation of switch 245, described immediately above, whereby reader 225 may be automatically switched on upon disposal of an item in enclosure 200 and subsequent closing of lid 222.

The description given above of RFID sensor or tag 120 applies similarly to RFID sensor or tag 220.

Enclosure 200 may be used to keep track of inventory of articles by tracking the articles, or the packaging thereof, as they are disposed of in enclosure 200. Where the article is something consumed (e.g., food), item 215 may be the packaging of the article; where the article is something that is used up but not physically consumed (e.g., a battery), item 215 may be the article itself. Thus, RFID tag 220 may be attached to item 215, be it the article itself being inventoried or the packaging thereof. An item 215 identified as being in enclosure 200 may be counted or decremented from inventory. The processor could, for example, determine whether inventory of a given article falls below a minimum threshold and, if so, cause a new supply of the article to be ordered. In view of the fact that enclosure 200 functions as a trash receptacle, interior region 205 may be lined with aforementioned liner 209, formed, e.g., of plastic, for containing items 215 being disposed of. In addition, enclosure 200 may be provided with a foot lever 260 or the like for opening lid 222.

In view of the above description of enclosure 200, enclosure 200 may be referred to as an RFID-enabled trash receptacle. Enclosure 200 may also serve applications such as an RFID-enabled storage receptacle, e.g., a refrigerator, pantry, or transport container.

Figure 5:
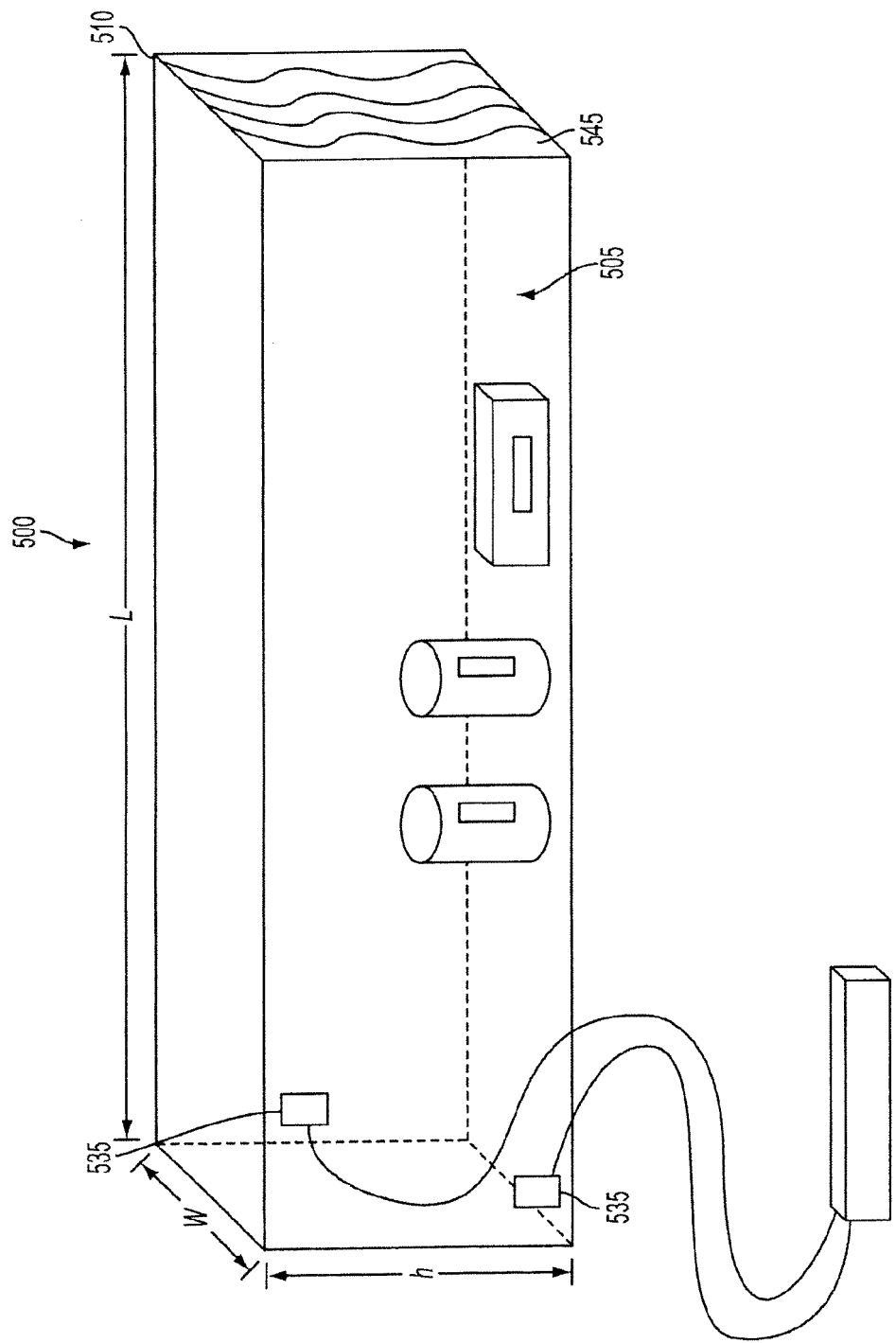
FIG. 5 is a schematic diagram of an RFID system including, inter alia, an enclosure with an electromagnetically absorbing portion in a first arrangement, which may function as a waveguide, in accordance with one or more embodiments of the present disclosure.

FIG. 5 illustrates an RFID system including an enclosure 500 having a structure 510 whose outer surface may (but need not) be partly or at least substantially conductive and whose inner surface may (but need not) be partly or at least substantially conductive. The RFID system of FIG. 5 is similar to that shown in FIG. 1 but differs therefrom as follows. Instead of a lid as displaceable portion 122 at one end of structure 110, structure 510 has an electromagnetically absorbing curtain 545 as a displaceable portion for at least one end of structure 510. Like lid 122, electromagnetically absorbing curtain 545 may function as a displaceable portion, permitting items to be transferred between an exterior of structure 510 and interior region 505, which is interior to structure 510. But by virtue of providing electromagnetically absorbing curtain 545 at one end of structure 510, instead of lid 122, enclosure 500 is rendered to function as a waveguide, in contrast to enclosure 100 that functions as a cavity. Electromagnetically absorbing curtain 545 absorbs electromagnetic waves at the end of enclosure 510 at which electromagnetically absorbing curtain 545 is located, such as to reduce or eliminate the reflection of waves from that end. In this way, enclosure 510 is rendered an effectively infinite waveguide (i.e., effectively infinite at the end containing electromagnetically absorbing curtain 545). Electromagnetically absorbing curtain 545 may be formed of a metamaterial or a non-metamaterial. As an alternative to the illustrated arrangement of FIG. 5, an electromagnetically absorbing portion could be provided near one or both ends of structure 510, or at another location, instead of at the end(s) of structure 510. As another alternative to the illustrated arrangement, functionality of a waveguide may be achieved by extending dimension L such that the end of structure 510 is sufficiently distant from the feed points (feeds 535) as to render the waves reflected at that end negligible.

Figure 6:
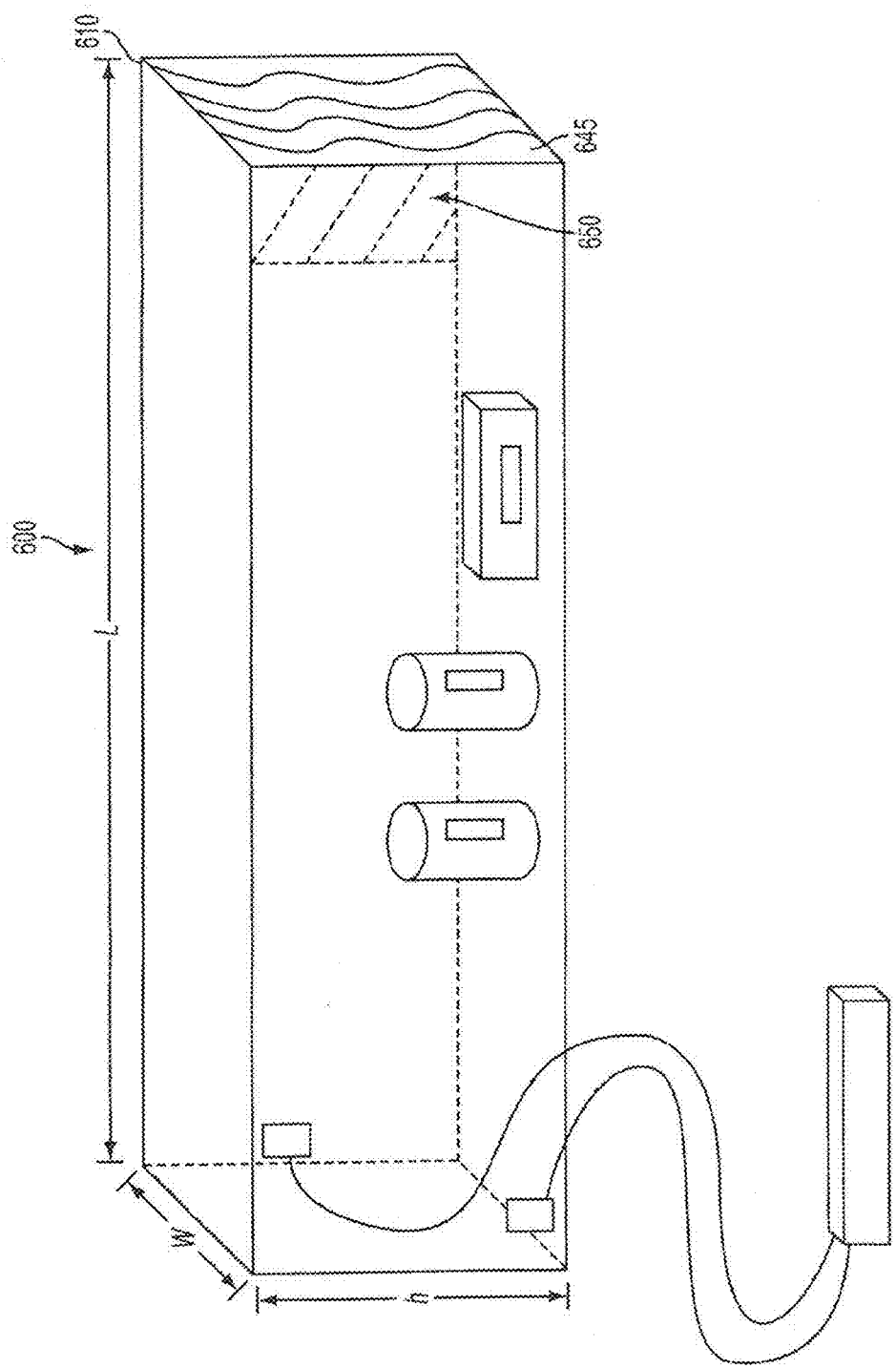
FIG. 6 is a schematic diagram of an RFID system including, inter alia, an enclosure with an electromagnetically absorbing portion in a second arrangement, which may function as a waveguide, in accordance with one or more embodiments of the present disclosure.

FIG. 6 illustrates an RFID system including an enclosure 600 having a structure 610 whose outer surface may (but need not) be partly or at least substantially conductive and whose inner surface may (but need not) be partly or at least substantially conductive. The RFID system of FIG. 6 is similar to that shown in FIG. 5, but differs therefrom as follows. Unlike FIG. 5, FIG. 6 includes an additional electromagnetically absorbing portion 650 on a side wall of structure 610, near and adjacent the end of structure 610 that has electromagnetically absorbing curtain 645. In FIG. 6, electromagnetically absorbing portion 650 on the sidewall extends rightward all the way to electromagnetically absorbing curtain 645, but the rightmost portion of electromagnetically absorbing portion 650 is hidden from view by electromagnetically absorbing curtain 645, due to the perspective nature of the drawing. The illustrated arrangement of electromagnetically absorbing portion 650 is to be understood as a non-limiting example; other arrangements (extent and positioning) of electromagnetically absorbing portion 650 are possible, as will be understood by having benefit of the instant disclosure.

Figure 7:
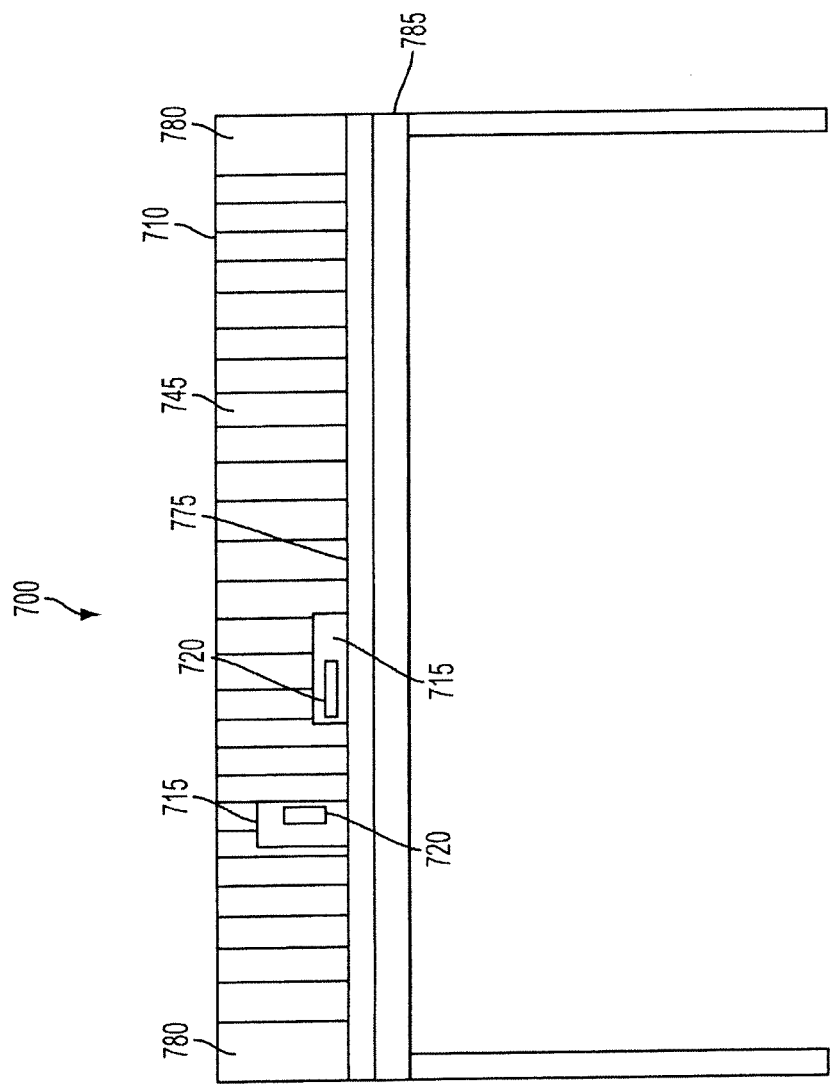
FIG. 7 is a schematic diagram of an RFID system including, inter alia, an enclosure with electromagnetically absorbing curtains at both ends thereof and a conveyor belt running therethrough, which may function as a waveguide, viewed in cross-section taken along the width of the enclosure, in accordance with one or more embodiments of the present disclosure.

FIG. 7 is a schematic diagram of an RFID system including, inter alia, an enclosure with electromagnetically absorbing curtains at both ends thereof and a conveyor belt running therethrough, that may function as a waveguide, viewed in cross-section taken along the width of the enclosure, in accordance with one or more embodiments of the present disclosure. The RFID system illustrated in FIG. 7 includes an enclosure 700 having a structure 710 whose outer surface may (but need not) be partly or at least substantially conductive and whose inner surface may (but need not) be partly or at least substantially conductive. The RFID system illustrated in FIG. 7 is similar to that illustrated in FIG. 5, but has certain differences therefrom.

Unlike the RFID system illustrated in FIG. 5, structure 710 of enclosure 700 of the RFID system illustrated in FIG. 7 has electromagnetically absorbing curtains 745 at both ends of structure 710. Because FIG. 7 is a cross section taken along the width of structure 710, only one set of electromagnetically absorbing curtain 745 (namely, the curtain behind items 715) is visible therein. This arrangement renders enclosure 700 an effectively infinite waveguide in both directions.

Additionally, in contrast to the RFID system illustrated in FIG. 5, the RFID system illustrated in FIG. 7 includes a conveyer belt 775. Conveyer belt 775 transports items 715, having RFID tags 720, through enclosure 700. That is, conveyer belt 775 conveys items 715 through a first set of electromagnetically absorbing curtains 745 at one end of enclosure 700, so that items 715 enter enclosure 700, then inside and along the length of enclosure 700, and finally through a second set of electromagnetically absorbing curtains 745 at the other end of enclosure 700, so that items 715 exit enclosure 700. In FIG. 7, conveyer belt 775 travels in a direction substantially perpendicular to the plane of the illustrated drawing sheet.

Further, physical barriers 780 may be provided at one or both sides of conveyer belt 775, along the length of enclosure 700. Barriers 780 may prevent items 715 from approaching the edges of conveyer belt 775. Barrier 780 may serve two purposes. First, items 715 approaching the edges of conveyer belt 775 could fall off conveyer belt 775 and get stuck inside enclosure 700 and create an obstruction to the continued transport of items 715 through enclosure 700, so barrier 780 helps prevent the occurrence of this obstruction. Second, in a case where the inner surfaces of one or both sidewalls of structure 710 are conductive, items 715 approaching the edges of conveyer belt 775 (and hence the edges of enclosure 700) may fail to be successfully read due to the fact that the electric field vanishes at a conductive surface. Thus, the barrier 780 serves to keep items 715 from being positioned in the region of a vanishing electric field.

In some embodiments, conveyer belt 775 may include a conductive layer to promote electromagnetic sealing or shielding of enclosure 700. In some embodiments, conveyer belt 775 may include a printed conductive pattern on top of a non-conductive layer with a lower conductive ground plane in order to create a near-field RFID surface on conveyer belt 775.

Conveyer belt 775 and/or enclosure 700 may be supported by a support structure 785. In some embodiments, support structure 785 (or more generally, a structure adjacent to conveyer belt 775) may be (partly or at least substantially) conductive to promote electromagnetic sealing or shielding of enclosure 700.

Electromagnetically absorbing curtains 745 may be formed of a series of flexible electromagnetically absorptive strips (as indicated by the vertical lines of element 745 shown in FIG. 7) suspended from the top of structure 710. The absorptive strips may overlap (leftward and rightward in the view of FIG. 7) with neighboring strips and may be long enough to contact conveyer belt 775, in order to provide a sufficient degree of electromagnetic sealing or shielding. In this regard, it may be noted that in some embodiments, e.g., for certain applications, the RFID system may be configured such that interrogation of an item 715 located on conveyer belt 775 but not within enclosure 700 does not constitute an erroneous read.

Figure 8:
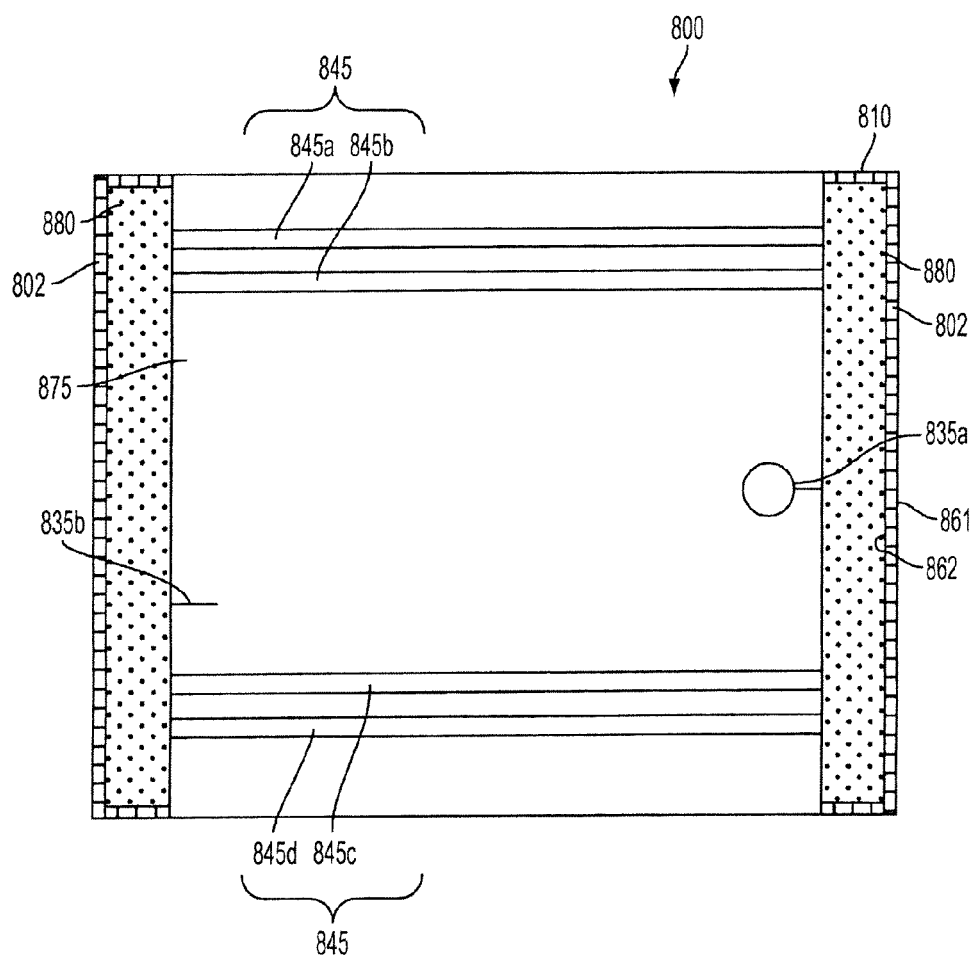
FIG. 8 is a top view of an enclosure similar to that illustrated in FIG. 7 and showing greater detail, in accordance with one or more embodiments of the present disclosure.

FIG. 8 illustrates an enclosure 800 having a structure 810 whose outer surface may (but need not) be partly or at least substantially conductive and whose inner surface may (but need not) be partly or at least substantially conductive. Enclosure 800 is similar to enclosure 700 illustrated in FIG. 7, but with certain differences therefrom. FIG. 8 is a top view, looking down on enclosure 800 from above, with the top of structure 810 of enclosure 800 being removed for illustrative purposes.

Enclosure 800 has a double set of electromagnetically absorbing curtains 845 at each end of enclosure 800, in contrast to enclosure 700, which has a single set of electromagnetically absorbing curtains 745 at each end thereof. With a double set of electromagnetically absorbing curtains 845 at each end, more continuous (over time) electromagnetic sealing or shielding of enclosure 800 can be achieved, as will now be explained. An item (not shown) to be interrogated passes through a first set 845a of electromagnetically absorbing curtains 845 at the entrance to enclosure 800. In order for the item to pass through, the first set 845a of electromagnetically absorbing curtains 845 must open (e.g., be pushed aside by the item passing therethrough). The item passes completely through the first set 845a of electromagnetically absorbing curtains 845 before reaching the second set 845b of electromagnetically absorbing curtains 845 at the entrance to enclosure 800, so that the first set 845a of electromagnetically absorbing curtains 845 is able to return to its closed position before the second set 845b of electromagnetically absorbing curtains 845 opens (e.g., by being pushed aside by the item entering enclosure 800).

Thus, by the time the second set 845b of electromagnetically absorbing curtains 845 opens under pressure from the item, the first set 845a of electromagnetically absorbing curtains 845 has already closed. The same procedure operates at the exit of enclosure 800, with the first set 845c of electromagnetically absorbing curtains 845 at the exit closing before the second set 845d of electromagnetically absorbing curtains 845 opens under pressure from the item. In this way, even when items are entering (or exiting) enclosure 800, it is less likely that both sets 845a and 845b (845c and 845d) of electromagnetically absorbing curtains 845 are open at the same time; rather, it is more likely that either one of 845a and 845b (845c and 845d) is closed during the passing of the item. Because one set of electromagnetically absorbing curtains (845a and 845b, or on the other end, 845c and 845d) is closed, electromagnetic sealing or shielding may be achieved continuously over time.

Enclosure 800 has an outer wall 802 (sidewall) having an outer surface 861 and an inner surface 862. Barriers 880 are provided, comparable to barriers 680, which may be particularly useful when inner surface 862 is conductive, due to the low or null electric fields that may occur near or at inner surface 862, as explained above. If inner surface 862 is not conductive, e.g., if it is formed of a metamaterial such that the electric field does not vanish at inner surface 862, barriers 880 may be reduced in thickness or may be eliminated.

Enclosure 800 may have feed loops 835a and 835b, one on each sidewall on either side of conveyer belt 875. Feed loops 835a and 835b may be oriented so as to have about a 90 degree rotation with respect to one another (for this reason, feed loop 835a appears as a loop while feed loop 835b appears as a straight line in FIG. 8).

In some embodiments, enclosures in RFID systems with conveyer belts such as the systems described with respect to FIGS. 7 and 8 may include metamaterial portions and/or folded configurations. In some embodiments, the enclosures of FIGS. 5-8 may be modified to have one or both ends thereof open, with electromagnetically absorbing material provided near the end(s) thereof.

The RFID systems illustrated in FIGS. 7 and 8, as well as other RFID systems discussed herein, may find application in the context of retail checkout. For example, grocery or shopping items may be placed on a conveyer belt to be conveyed into an enclosure for RFID interrogation. Alternatively, an entire shopping container (e.g., shopping bag or shopping cart) may be placed on a conveyer belt to be conveyed into an enclosure for RFID interrogation. These RFID systems could also be applied to cargo containers or the like. One advantage of RFID over bar codes (commonly used in retail checkout today) is that, with RFID, multiple items may be detected nearly simultaneously whereas with bar codes each item is scanned individually. This process of simultaneous detection means that RFID may permit much quicker identification, tracking or the like of items as compared to bar codes, which may permit great improvement in efficiency.

FIGS. 9A, 9B and 9C are schematic diagrams of an RFID system including, inter alia, separate interrogation and collection chambers in a first arrangement, in accordance with one or more embodiments of the present disclosure. FIGS. 9A, 9B and 9C illustrate chronologically successive stages of operation of such system. FIG. 9A depicts the system upon insertion of an item to be interrogated. FIG. 9B depicts the system during interrogation of the item. FIG. 9C depicts the system during deposition of an interrogated item into the collection region.

As illustrated in FIGS. 9A-9C, enclosure 900 comprises a structure 910 defining a boundary between an interior region 905, interior to structure 910, and an exterior of the structure. Structure 910 may be at least substantially closed, as illustrated, or partly closed. Structure 910 has an inner surface facing interior region 905 and an outer surface facing the exterior (facing away from interior region 905). It will be noted that the exterior of structure 910 is not necessarily exterior to any structure, i.e., it is not necessarily in free space. As illustrated, the portion of the exterior of structure 910 that is below structure 910 is within another structure, namely the structure of collection region 940, described below. Interior region 905 comprises an interrogation region 941 for interrogation of an RFID sensor 920 attached to an item 915 within interrogation region 941. Although as illustrated interrogation region 941 is coextensive with interior region 905, this characteristic need not be the case, and interrogation region 941 may be only a part of interior region 905. The shape and dimensions of structure 910 may differ from those illustrated in FIGS. 9A-9C.

Collection region 940 is for receiving item 915 from interrogation region 941, after RFID sensor 920 attached to item 915 has been interrogated. Although collection region 940 is illustrated as part of the same overall structure as interrogation region 941, this illustrated embodiment need not be the case, and collection region 940 could be entirely separate from interrogation region 941 in another embodiment. Where collection region 940 is part of the same overall structure as interrogation region 941, collection region need not be located below interrogation region 941; the two regions could be arranged differently. The dashed line portion of collection region 940 shown in FIGS. 9A-9C indicates a portion of collection region 940 that is filled with items 915, although items 915 are not illustrated therein.

It should be noted that structure 910 of enclosure 900 includes partition 923, which defines a boundary between interrogation region 941 and the exterior of interrogation region 941. Again, the exterior of interrogation region 941 need not be free space, but could be within another structure, as illustrated in FIGS. 9A-9C. As illustrated, partition 923 defines a boundary between interrogation region 941 and collection region 940, but in other arrangements collection region 940 could be separated from interrogation region 941 and partition 923 could define a boundary between interrogation region 941 and the exterior thereof, such that the boundary does not coincide with a boundary of collection region 940.

At least a portion of partition 923 is displaceable so as to permit item 915 to be transferred between interrogation region 941 and collection region 940. As illustrated, partition 923 may be configured as a releasable holding shelf that opens or falls down after item 915 is interrogated, so as to let item 915 drop into collection region 940. Such releasable holding shelf may be hinged, as shown, or otherwise configured for opening and closing. More generally, partition 923 may be configured in a different manner as a structure that may be at least partly displaced so as to create an exit from interior region 905 whereby item 915 can be moved to collection region 940.

Structure 910 may include a displaceable portion 922 configured (1) for opening, so as to create an entry or opening between structure 910 and space exterior thereof, and (2) for closing, so as to close the opening between structure 910 and the space exterior thereof, whereby item 915 may be transferred between the exterior and interrogation region 941 via the opening. As illustrated, displaceable portion 922 may be a hinged lid, but more generally, displaceable portion 922 may be configured in a different manner as a structure that may be at least partly displaced so as to create an entrance to interior region 905 whereby item 915 can be put into interrogation region 941.

Structure 910 may be formed in such a manner that at least substantially all of the outer surface of structure 910 (including the outer surface of displaceable portion 922 and the outer surface of partition 923) is conductive, such that when displaceable portion 922 and partition 923 are closed structure 910 is electromagnetically sealed or shielded with respect to the exterior thereof. Such electromagnetic sealing or shielding of structure 910 may be at least substantially complete or may be incomplete, for example, where structure 910 is only partly closed.

Structure 910 may also be formed in such a manner that only part of the outer surface of structure 910 is conductive. Structure 910 may be formed in such a manner that at least substantially all of the inner surface of structure 910 (including the inner surface of displaceable portion 922 and the inner surface of partition 923) is conductive, such that when displaceable portion 922 and partition 923 are closed, structure 910 is electromagnetically sealed or shielded with respect to the exterior thereof. Such electromagnetic sealing or shielding of structure 910 may be at least substantially complete or may be incomplete, for example, where structure 910 is only partly closed. Structure 910 may also be formed in such a manner that only part of the outer surface of structure 910 is conductive. Structure 910 may be formed in such a manner that interior region 905 is substantially surrounded by a conductive boundary formed of a combination of inner and outer surfaces of structure 910, either or both of which surfaces may be at least partly or at least substantially conductive. For example, the inner surface of displaceable portion 922 might be a conductive surface and the remaining outer surface of the structure 910 might be a conductive surface. Thus, structure 910 may be at least partly or at least substantially conductive. However, it is not necessary that a part of the outer surface of structure 910 be conductive (to whatever extent) or that a part of the inner surface of structure 910 be conductive (to whatever extent).

Structure 910 may or may not include a portion formed of a metamaterial or of an electromagnetically absorbing material (whether metamaterial or not). The description of metamaterial portions and electromagnetically absorbing portions given with respect to structure 110 is similarly applicable with respect to structure 910.

The RFID system illustrated in FIGS. 9A, 9B and 9C may include an RFID interrogator (not shown in FIGS. 9A-C, but similar in structure and function to the RFID interrogators 125, 225 described herein), which may be connected to one or more RF transmission lines (also not shown in FIGS. 9A-C, but similar in structure and function to the RF transmission lines 130, 230 described herein), each of which may terminate in a feed (not shown in FIGS. 9A-C, but similar in structure and function to the feed 135, 235 described herein) attached to structure 910. The feeds may be feed probes, planar feeds or feeds in the form of a closed shape.

Item 915 placed into enclosure 900 has an RFID sensor or tag 920 attached to it. RFID tag 920 may include an integrated circuit or may be a SAW RFID sensor. RFID tag 920 may operate in the manner described previously herein for the RFID system illustrated in FIG. 1.

As mentioned, the geometry of enclosure 900 or structure 910 and any items 915 within it, the characteristics and placement of the feed(s), and the frequency of operation are factors that determine the modes that may be excited within interior region 905.

In operation, a single item 915 may be placed within interior region 905 via the opening created by displaceable portion 922. Displaceable portion 922 may then be closed. RFID tag 920 on item 915 may then be interrogated in the manner described previously for the operation of the RFID system illustrated in FIG. 1 (use of RFID reader, transmission line(s), feed(s) and processor to send and receive appropriate signals and generate an electromagnetic field, etc.). After RFID tag 920 has been interrogated, partition 923 may be displaced (e.g., releasable holding shelf may be released), so as to permit (cause) item 915 to be transferred to collection region 940.

In some embodiments, the RFID system illustrated in FIGS. 9A-9C may include a sensor (not illustrated) configured for (1) determining whether item 915 is located in interrogation region 941, and (2) in response to a determination that item 915 is located in interrogation region 941, triggering the feed(s) to generate the electromagnetic field in interrogation region 941. Such sensor could be incorporated in a processor associated with an RFID reader.

In some embodiments, the RFID system illustrated in FIGS. 9A-9C may include a detector (not illustrated) configured for (1) determining whether RFID sensor 920 in interrogation region 941 has been successfully interrogated, and (2) in response to a determination that RFID sensor 920 in interrogation region 941 has not been successfully interrogated, triggering a change in the electromagnetic field in interrogation region 941. Such detector could be incorporated in a processor associated with an RFID reader. Such a change in the electromagnetic field to be triggered could be effected, for example, by (1) causing the RFID reader to transmit a signal to a different feed in order to excite different electromagnetic cavity modes, (2) increasing the transmission power of the RFID reader, or (3) altering an aspect of interior region 905 in order to induce different electromagnetic field patterns, or modes.

In some embodiments, partition 923 is a "smart surface," that is, a near-field device that enables interrogation of RFID tags 920 attached to items 915 located on or near partition 923.

Interrogation region 941 may also be referred to as an "antechamber", inasmuch as item 915 is placed in interrogation region 941 initially for interrogation, and after interrogation item 915 is transferred to collection region 940.

As mentioned, one challenge for identifying each item tagged with an RFID tag is that a high density of items may result in some RFID tags 920 being blocked from receiving adequate field levels during interrogation. By placing one item 915 (or a small number of items) at a time in interrogation region 941, this problem may be mitigated or overcome.

FIGS. 10A and 10B are schematic diagrams of an RFID system including, inter alia, separate interrogation and collection chambers in a second arrangement, in accordance with one or more embodiments of the present disclosure. FIGS. 10A and 10B illustrate chronologically successive stages of operation of such system. FIG. 10A depicts the system upon insertion of an item to be interrogated. FIG. 10B depicts the system during deposition of an interrogated item into the collection region.

The RFID system illustrated in FIGS. 10A and 10B is similar to that illustrated in FIGS. 9A-9C, but has certain differences therefrom. The RFID system illustrated in FIGS. 10A and 10B includes an enclosure 1000 having a structure 1010 whose outer and/or inner surface may (but need not) be partly or at least substantially conductive, as was described previously with respect to enclosure 900.

As illustrated in FIGS. 10A and 10B, collection region 1040 may rest on a supporting structure 1085, that may be mobile, as illustrated, or stationary. This arrangement could find application, for example, in RFID-enabled shopping carts, cargo transfer containers, etc.

Again, as illustrated, the top portion 1063 of structure 1010 has a displaceable portion (not shown; blocked from view by insertion device 1027) which may be displaced to create an entry or opening therein in response to pressure applied by an insertion device 1027 which may hold or fasten to an item 1015 and insert item 1015 into interrogation region 1041 within interior region 1005. Item 1015 has an RFID tag 1020 attached to it. Insertion device 1027 may be a mechanical device or a human arm and hand. When the displaceable portion is displaced so as to create the opening in top portion 1063, top portion 1063 may form a (physical and) electromagnetic seal around insertion device 1027. The seal may be at least substantially complete or partial. The seal may be formed, for example, by fabric leaves having a conductive ribbon border that acts as spring. This seal is useful because insertion device 1027 remains inserted in interrogation region 1041 while RFID tag 1020 of item 1015 is interrogated. Accordingly, the seal keeps interrogation region 1041 (interior region 1005) electromagnetically sealed or shielded during interrogation, which may improve the rate of successful interrogation.

In some embodiments, RFID interrogator 1025 may be triggered by the formation of the opening in top portion 1063, by the use of one or more sensors, such as ionic polymer metal composite (IPMC) sensors, appropriately positioned, e.g., at or near the formed opening. When triggered, RFID interrogator 1025 transmits a signal via one or more RF transmission lines 1030 to one or more feeds 1035, which generate an electromagnetic field within interrogation region 1041.

As seen in FIG. 10B, after item 1015 has been interrogated, insertion device 1027 extends further downward, and bottom portion 1064 opens in response to pressure applied by insertion device 1027. Bottom portion 1064 may be configured in the same way as described above with respect to top portion 1063, with a displaceable portion, configured to form an opening, means for forming a seal at the opening, etc. When item 1015 has been inserted in collection region 1040 by insertion device 1027, insertion device 1027 releases item 1015 into collection region 1040 and withdraws upward out of collection region 1040 and enclosure 1000. Insertion device 1027 can then retrieve another item 1015 and repeat the process.

Further to the above description of the structure and operation of the RFID system illustrated in FIGS. 10A and 10B, the description given above of the structure and operation of the RFID system illustrated in FIGS. 9A-9C applies to the RFID system illustrated in FIGS. 10A and 10B.

Figure 11A:
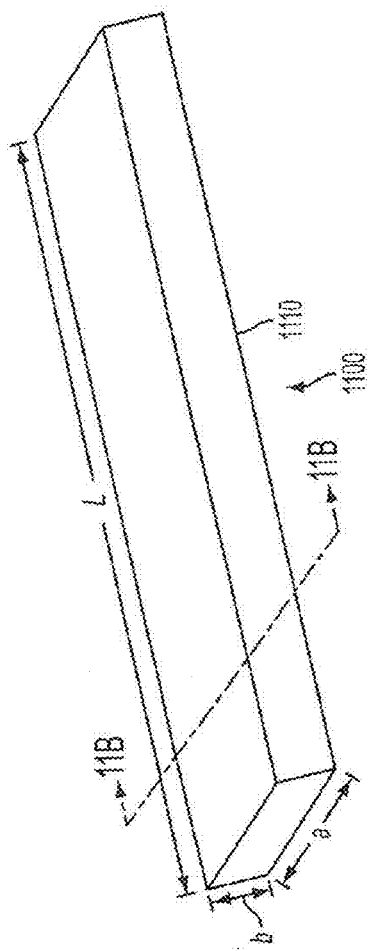
FIGS. 11A, 11B and 11C illustrate waveguides with and without a metamaterial sidewall structure, showing the effect of the metamaterial on the electromagnetic field distribution within the waveguide, in accordance with one or more embodiments of the present disclosure.
Figure 11C:
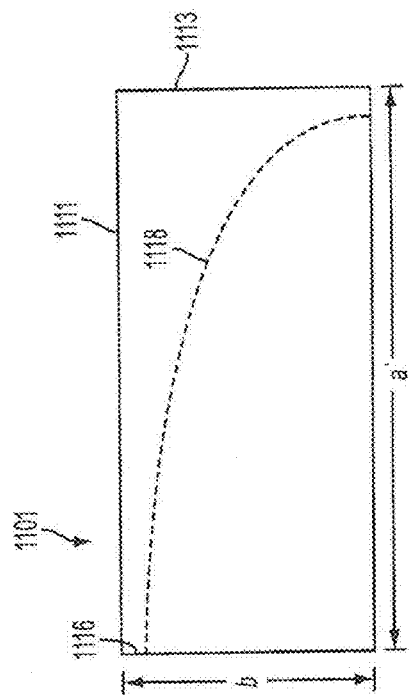
Figure 11B:
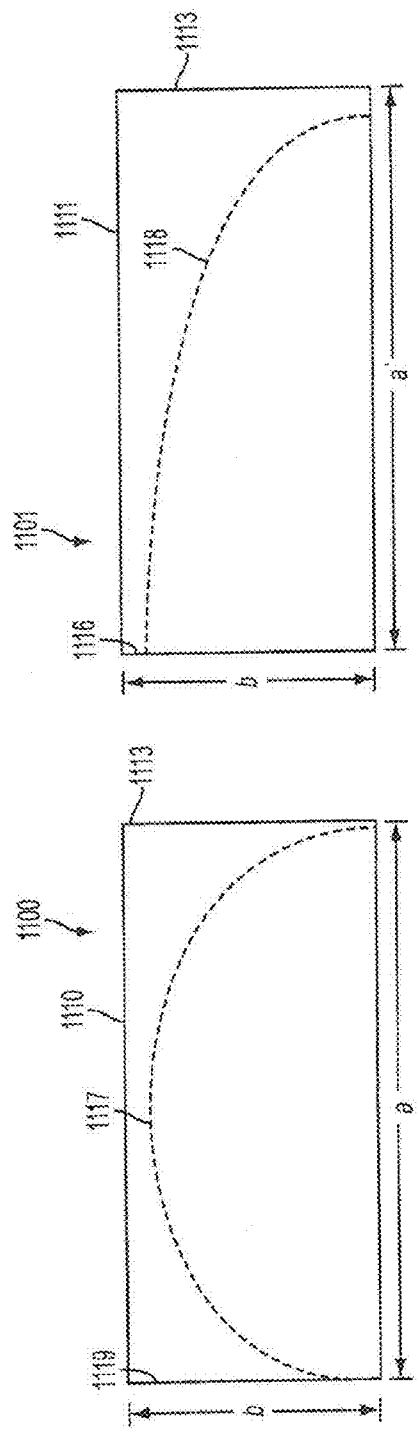

FIGS. 11A, 11B and 11C illustrate waveguides with and without a metamaterial sidewall structure, showing the effect of metamaterial on the electromagnetic field distribution within the waveguide.

FIG. 11A depicts a rectangular waveguide 1100 having a structure 1110, portions of which are conductive as specified hereinbelow. Waveguide 1100 has width a, height b and length L. It is assumed for illustrative purposes herein that a>b. In order for a wave of the lowest order mode to propagate through waveguide 1100, width a must be at least as large as approximately one half of the wavelength of the wave.

FIG. 11B depicts a cross-sectional view of waveguide 1100 shown in FIG. 11A, taken along the line 11B-111B near one end of the waveguide 1100. The dashed curved line in FIG. 11B represents the electromagnetic field strength distribution 1117 over the cross-section for a lowest order mode in waveguide 1100. As seen, the amplitude distribution, or envelope, 1117 corresponding to this lowest order mode has a shape approximate to that of a half period of a sinusoidal wave, with the magnitude of the electromagnetic field strength going to zero or near zero at or near conductive sidewalls 1119 and 1113 of waveguide 1100. An infinite number of higher order modes also satisfy the boundary conditions presented by the waveguide 1100.

FIG. 11C depicts a cross-sectional view from an end of waveguide 1101 having a structure 1111 whose outer surface may be partly or at least substantially conductive. Waveguide 1101 has width a' and height b. Waveguide 1101 is similar to waveguide 1100 shown in FIG. 11B, but in waveguide 1101 sidewall 1116 has been modified, as compared to sidewall 1119 of waveguide 1100. Sidewall 1113 is a conductive structure, such that all of its surfaces, including the inner surface that faces toward the inside of enclosure 1101 and the outer surface that faces the exterior of enclosure 1101, are conductive. In contrast, sidewall 1116 is formed of a metamaterial, whereby its outer surface is conductive but its inner surface is not. The metamaterial may be, e.g., a PMC-like metamaterial. By virtue of the metamaterial structure of sidewall 1116, the width a' of waveguide 1101 may be reduced to about one half of the width a of waveguide 1100 while still permitting propagation of a wave through waveguide 1101 for wave frequencies arbitrarily close to, but above, the cutoff frequency associated with waveguide 1100. That is, in order for a wave to propagate through waveguide 1101, width a' must be at least as large as approximately one quarter of the wavelength of the wave. An infinite number of higher order modes also satisfy the boundary conditions presented by waveguide 1101.

FIG. 11C also depicts electromagnetic field strength distribution 1118 over the cross-section for a lowest order mode in waveguide 1101. In contrast to the distribution 1117 for waveguide 1100, the electromagnetic field strength distribution 1118 for the lowest order mode has a shape approximate to that of a quarter period of a sinusoidal wave, with the magnitude of the electromagnetic field strength reaching a maximum at or near sidewall 1116 having a metamaterial structure. This difference in the field strength at the respective sidewalls of waveguides 1100 and 1101 may be explained as follows. With conductive interior surface of sidewall 1119, the reflection of the wave from that surface is 180 degrees out of phase with the wave incident on the surface, such that the incident and reflective waves cancel each other out, resulting in the null field at the surface. In contrast, with the metamaterial sidewall 1116, the reflection of the wave from the inner surface thereof is in phase with the wave incident on that surface, whereby the sum of the incident and reflective waves results in a field strength twice that of either wave individually.

Figure 12A:
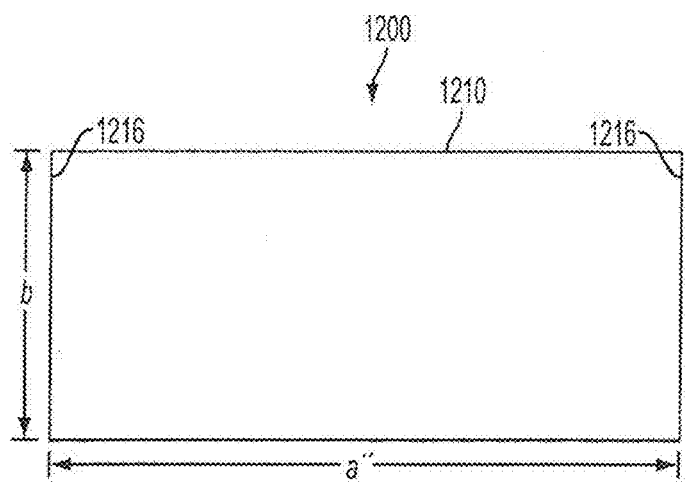
FIG. 12A illustrates a waveguide with both sidewalls formed of a metamaterial.
Figure 12B:
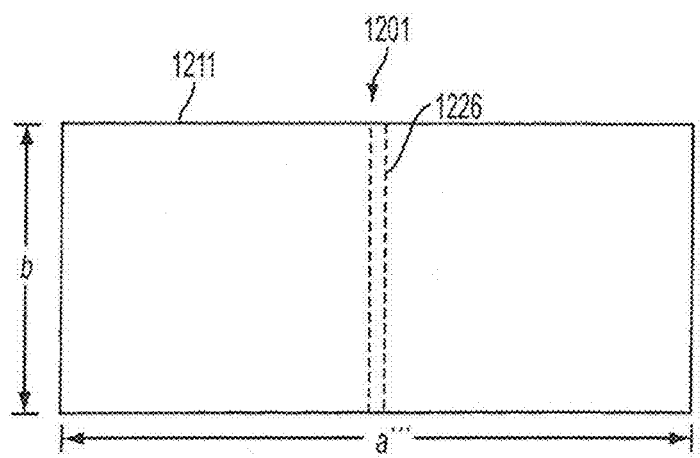
FIG. 12B illustrates a waveguide with an interior wall formed of a metamaterial, in accordance with one or more embodiments of the present disclosure.

FIG. 12A illustrates a waveguide with both sidewalls formed of a metamaterial, and FIG. 12B illustrates a waveguide with an interior wall formed of a metamaterial, in accordance with one or more embodiments of the present disclosure.

FIG. 12A illustrates a cross-sectional view from one end of a waveguide 1200 having a structure 1210 whose outer structure may (but need not) be partly or at least substantially conductive and whose inner structure may (but need not) be partly or at least substantially conductive. Waveguide 1200 has width a" and height b. Waveguide 1200 is similar to waveguide 1101 (FIG. 11C) but differs therefrom in that not only one, but both sidewalls 1216 are formed of a metamaterial. The metamaterial may be, for example, a PMC-like metamaterial.

Waveguide 1200 operates as a parallel plate waveguide that supports TEM or quasi-TEM waves over the operating spectrum. Because the two metamaterial walls 1216 are behaving like PMC's, the transverse field is approximately uniform across width a" of waveguide 1200 within the operating band. Width a" may be smaller than width a' of waveguide 1101 while still permitting propagation of a wave with a frequency that is below the cutoff frequency of the waveguide structure 1101. Thus, in comparison to envelopes 1117 and 1118 (FIGS. 11B and 11C), in FIG. 12A the electromagnetic field strength envelope would appear relatively flat, i.e., approximately a straight line at constant height going from one side 1216 to the other side 1216. Such PMC or PMC-like sidewalls may be created using frequency selective surfaces, as described in S. Maci, et al, "A Pole-Zero Matching Method for EBG Surfaces Composed of a Dipole FSS Printed on a Grounded Dielectric Slab," *IEEE Transactions on Antennas and Propagation*, Vol. 53, No. 1, January 2005, which is incorporated in its entirety herein by reference.

FIG. 12B illustrates a cross-sectional view from one end of a waveguide 1201 having a structure 1211 whose outer surface may (but need not) be partly or at least substantially conductive and whose inner surface may (but need not) be partly or at least substantially conductive. Waveguide 1201 has width a''' and height b. Waveguide 1201 is similar to waveguide 1200 (FIG. 12A) but differs therefrom in that it does not have any sidewalls formed of a metamaterial; instead, waveguide 1201 has an interior wall 1226 formed of a metamaterial.

The interior metamaterial wall 1226 reduces the minimum magnitude for width a''' of waveguide 1201 required for propagation of an electromagnetic wave through waveguide 1201. The use of such interior metamaterial walls is described in N. Engheta, "A Metamaterial Surface for Compact Cavity Resonators," *IEEE Antennas and Wireless Propagation Letters*, Vol. 3, 2004, which is incorporated in its entirety herein by reference.

The enclosures of the embodiments shown in FIGS. 11A, 11B, 11C, 12A and 12B have been referred to herein as "waveguides." It will be noted that for an enclosure to function as a waveguide, the enclosure should be sufficiently long and the "end(s)" thereof sufficiently distant from the source of electromagnetic energy such that the energy has effectively dissipated before reaching the end, the result being that no substantial wave is reflected back. Alternatively, electromagnetically absorbing material may be placed within or on surfaces of the enclosure, e.g., at or near the terminal end(s) thereof, to promote a waveguide functionality. In contrast, when the enclosure is terminated such that a substantial portion of the energy incident on the end(s) is reflected back from the end(s), the enclosure will function as a cavity rather than a waveguide. In this sense, the termination, or the nature of the structure at or near the terminal ends, of the enclosure determines whether the enclosure supports the functionality of a waveguide or of a cavity. Accordingly, enclosures described herein may generally be converted from functionality of a waveguide to functionality of a cavity, or vice versa, by appropriate modification of the structure of the enclosure, in particular the portions at or near the ends of the structure.

FIG. 13A depicts an enclosure having reflecting boundary conditions at its ends, while FIG. 13B depicts an enclosure having absorbing boundary conditions at its ends, in accordance with one or more embodiments of the present disclosure. As discussed above, the enclosure of FIG. 13A functions as a cavity with an associated infinite set of resonant modes. The enclosure of FIG. 13B functions instead as a waveguide supporting propagating waves at the frequencies above the waveguide cutoff.

FIG. 13A depicts a waveguide 1300 having a structure 1310 whose outer surface may (but need not) be partly or at least substantially conductive and whose inner surface may (but need not) be partly or at least substantially conductive, unless indicated otherwise below. Waveguide 1300 has length L, height b, and a width that is not depicted in the view illustrated. Waveguide 1300 has side wall surface 1302 and top and bottom surfaces 1308 and 1306, respectively. Waveguide 1300 is configured as a cavity by having two PEC boundaries at the interior of "end" surfaces 1316 thereof. Alternatively, the two boundaries could be PMC boundaries, in which case the load impedance $Z_L$ would be infinity rather than zero. In either case, the two boundaries act to create an impedance mismatch and thereby return a significant portion of the energy incident threat back toward the center of waveguide 1300. The magnitude of the electromagnetic wave outside the ends of the waveguide 1300 is zero and a standing wave is created inside waveguide 1300.

FIG. 13B depicts a waveguide 1301 having a structure 1311 whose outer surface may (but need not) be partly or at least substantially conductive and whose inner surface may (but need not) be partly or at least substantially conductive, unless indicated otherwise below. Waveguide 1301 has length L, height b and a width that is not depicted in the view illustrated. Waveguide 1301 has side wall surface 1302 and top and bottom surfaces 1308 and 1306, respectively. Waveguide 1301 is configured as an effective infinite waveguide by establishing an electromagnetically absorbing boundary condition at the interior of each of two "end" surfaces 1336, with the absorbing loads being matched to the waveguide characteristic impedance over the band of operation. Such boundary conditions can be implemented by placing absorbing material, e.g., microwave absorbing material, at end surfaces 1336. As an alternative, the electromagnetically absorbing material/condition can be placed or established at only one end surface 1336. As another alternative, the absorbing material can be placed along the side wall surfaces 1302 or along the top and bottom surfaces 1308 and 1306, respectively, approaching or near one or both of end surfaces 1336. If the electromagnetic wave is sufficiently attenuated before reaching the ends of waveguide 1301, there is effectively no reflected signal; hence, no standing wave is created in waveguide 1301. In this case, the impedance ($Z_L$) seen by the electromagnetic wave at the ends of waveguide 1301 equals the impedance ($Z_0$) seen by the electromagnetic wave inside the waveguide 1301, thus creating a propagating or travelling wave within the waveguide 1301.

A standing wave is characterized by null or low regions as well as peak regions. By contrast, a propagating wave within a waveguide maintains a uniform amplitude envelope in the direction of propagation. Load boundaries in between a perfect short or perfect open result in an amplitude envelope with ripple; i.e., peak and low regions that are not as extreme. Frequencies sufficiently removed from discrete modes of a cavity 1300 such as that depicted in FIG. 13A, are not likely to reach RFID tags within the cavity 1300. In contrast, the effective infinite waveguide 1301, depicted in FIG. 13B, supports continuous operation across the spectrum of operation, assuming the entire band is above any potential cutoff frequencies.

Folded configurations will now be described, with reference to FIGS. 14A, 14B, 15A, 15B and 16A-L. As mentioned, folded configurations may be achieved by use of one or more interior walls (walls extending within the interior of the enclosure) or the like barriers which divide the interior of the enclosure (e.g., along one or more given dimensions) into multiple separate subregions while providing for inductive coupling of (electromagnetic fields in) the two subregions to occur around the end of, or through, the barrier. Such coupling may be provided for by providing an electromagnetic aperture in the interior wall or barrier, which electromagnetically connects the two subregions on either side of the wall or barrier. Such an electromagnetic aperture may, but need not, be a physical aperture. Thus, the two separate subregions may be physically separated by the interior wall or barrier, or they may be physically connected via a physical gap in the wall or barrier. The interior wall or barrier may extend all the way across the interior of the enclosure from one inner surface thereof to another, or it may extend only part way across the interior of the enclosure, from one inner surface thereof toward another.

The present disclosure includes embodiments comprising an enclosure having a structure whose outer surface may (but need not) be partly or at least substantially conductive and whose inner surface may (but need not) be partly or at least substantially conductive. With regard to the description hereinbelow with respect to FIGS. 14A-16L, it is noted as a general limitation that when the description states that an enclosure has a structure whose outer surface may (but need not) be partly or at least substantially conductive and whose inner surface may (but need not) be partly or at least substantially conductive, this statement is intended to assert also that the surface of any interior wall (for achieving a folded configuration) also may (but need not) be partly or at least substantially conductive. In addition, with regard to the description hereinbelow with respect to FIGS. 14A-16L, it is noted that when the description states that an enclosure has a structure whose outer surface may (but need not) be partly or at least substantially conductive and whose inner surface may (but need not) be partly or at least substantially conductive, this statement is intended as a general limitation subject to possibly being superseded by more specific statements (exceptions) given in the descriptions of the specific embodiments illustrated by those figures.

The enclosures of FIGS. 14A-16L may be rendered to function as cavities or as waveguides by appropriate adjustments to the ends thereof, as discussed above. In some embodiments, an electromagnetically absorbing material may be provided at or near one or more end portions of the enclosure to promote functionality of a waveguide. In this regard, it is also possible to leave one or both ends of a waveguide open, e.g., if sufficient electromagnetically absorbing material is so provided.

FIGS. 14A and 14B depict a first example of the process of folding of an enclosure, in accordance with one or more embodiments of the present disclosure.

FIG. 14A depicts an enclosure 1400 having a structure 1410 whose outer surface may (but need not) be partly or at least substantially conductive and whose inner surface may (but need not) be partly or at least substantially conductive. Enclosure 1400 has dimensions of width a, height b and length L. FIG. 14B depicts the enclosure 1400 "folded" about the directional axis of its width a to create a folded enclosure 1401.

Enclosure 1401 has a structure 1411 whose outer surface may (but need not) be partly or at least substantially conductive and whose inner surface may (but need not) be partly or at least substantially conductive. Enclosure 1401 has width a', length L', and a height that that may be thought of as having two components, namely, height b' for top section 1412 and height d' for bottom section 1414. Although enclosure 1401 is shown having height b' approximately equal to height d', length L' approximately half of length L, and width a' approximately equal to width a, these dimensions of enclosure 1401 could have different values. Folding, however, does allow a decrease in the magnitude of a physical dimension, such as length L', without adversely affecting performance of the enclosure.

Enclosure 1401 includes a longitudinal interior wall or surface 1490, which divides enclosure 1401 into top section 1412 and bottom section 1414, and a vertical interior wall or surface 1492, which separates top section 1412 and bottom section 1414 from end section 1416. In various embodiments, the relative sizes of the top section 1412 and the bottom section 1414 may be the same or one section may be smaller than the other.

If one of sections 1412, 1414 and 1416 is not used for containing items, for example, end section 1416, then it could be filled with a dielectric material, which would permit additional reductions in one or more dimensions of that section. In this case, the filled section may be a solid section, rather than an empty space, in which case items could not be placed in the filled section.

Figure 15A:
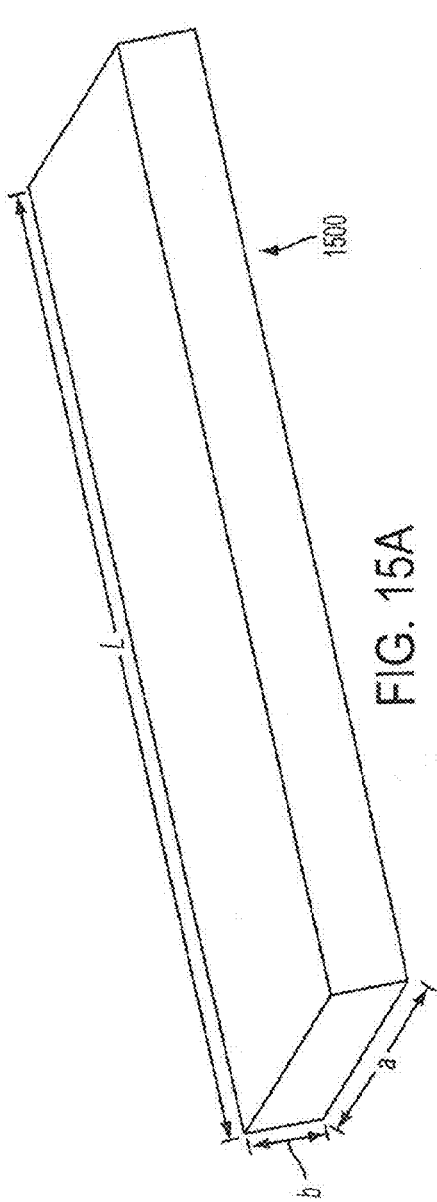
FIGS. 15A and 15B depict a second example of folding of an enclosure, in accordance with one or more embodiments of the present disclosure.
Figure 15B:
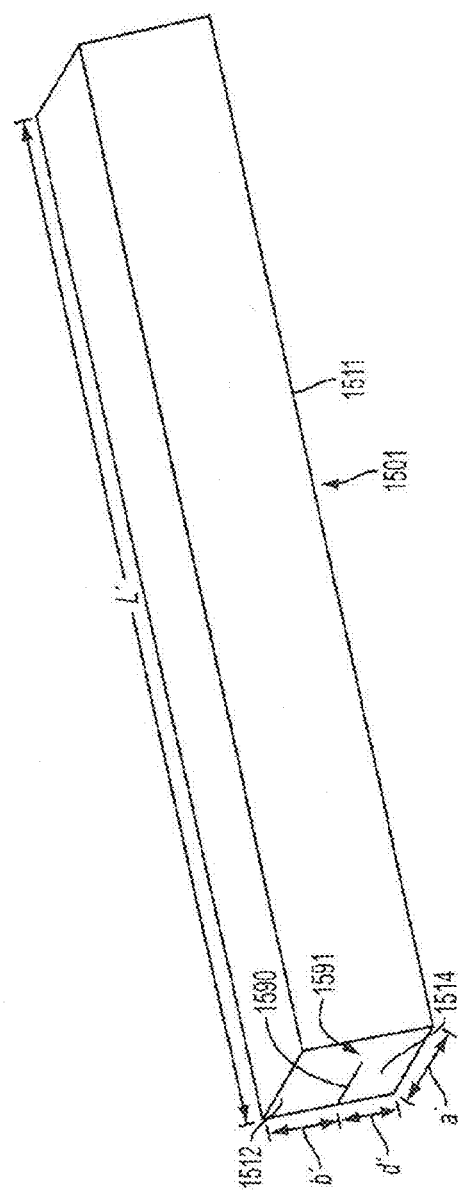

FIGS. 15A and 15B depict a second example of folding of an enclosure, in accordance with one or more embodiments of the present disclosure.

The example of folding of FIGS. 15A and 15B is similar to that of FIGS. 14A and 14B, but differs therefrom in certain respects.

FIG. 15A depicts an enclosure 1500 identical to enclosure 1400 shown in FIG. 14A. FIG. 15B depicts the enclosure 1500 "folded" about the directional axis of its length L to create a folded enclosure 1501.

Enclosure 1501 has a structure 1511 whose outer surface may (but need not) be partly or at least substantially conductive and whose inner surface may (but need not) be partly or at least substantially conductive. Enclosure 1501 has width a', length L', and a height that that may be thought of as having two components, namely, height b' for top section 1512 and height d' for bottom section 1514. As with enclosure 1401, the dimensions of enclosure 1501 may differ from what is illustrated.

Enclosure 1501 has a longitudinal interior surface or wall 1590 that divides enclosure 1501 into top section 1512 and a bottom section 1514. It will be noted that interior wall or surface 1590 does not extend across the entire width a', but leaves a gap or aperture 1591 for coupling of the electromagnetic field between the two sections 1512 and 1514. Thus, in this case, aperture 1591 is both an electromagnetic aperture and a physical aperture. In other embodiments, as exemplified in enclosure 1401, the electromagnetic aperture need not be a physical aperture.

Further to the above description of enclosure 1501, the above description of enclosure 1401 applies here.

FIGS. 16A-16L depict various folded enclosures, applicable to various drawer and cabinet arrangements.

FIG. 16A is a perspective view of a folded enclosure 1600a that may find application as, among other things, an RFID-enabled drawer or the like. FIG. 16B is a lengthwise cross-section of enclosure 1600a of FIG. 16A taken along the line 16B-16B.

Enclosure 1600a has a structure 1610a whose outer surface may (but need not) be partly or at least substantially conductive and whose inner surface may (but need not) be partly or at least substantially conductive. Enclosure 1600a has width a, height b, and length L. The dimensions are not necessarily drawn to scale and hence may be other than illustrated. Enclosure 1600a has two side walls 1602a, two end walls 1604a, a top wall 1608a and a bottom wall 1606a.

Enclosure 1600a has a longitudinal interior wall 1690a. Interior wall 1690a does not extend all the way from one end 1604a to the other end 1604a, but rather a gap or aperture 1691a is left at one end of interior wall 1690a. Interior wall 1690a serves to "fold" enclosure 1600a, dividing it into a top section 1612a and a bottom section 1614a. A conductive layer 1693a may be applied to the top surface of interior wall 1690a.

Where enclosure 1600a is used as a drawer, in practical application by a user, top section 1612a may serve as the functional portion of the drawer for containing items, and interior wall 1690a may serve as the bottom of the drawer. Bottom section 1614a, under interior wall 1690a, may be a solid volume, such as wood or laminate as commonly found in drawer bottoms. Alternatively, the solid volume could comprise a dielectric material such as commonly used in radio frequency applications and microwave printed circuit boards. Alternatively, bottom section 1614a could be a partly or completely empty space, in which case interior wall 1690a may be thought of as a false floor. In this case, a solid piece of material may be employed to physically close aperture 1691a so as to block physical passage of items between top section 1612a and bottom section 1614a.

Any of side walls 1602a, end walls 1604a, top wall 1608a, bottom wall 1606a, and interior wall 1690a, or any combination thereof, may be formed of a metamaterial or include a metamaterial portion, e.g., a PMC-like structure. As described previously with reference to FIGS. 11C, 12A and 12B, use of a metamaterial structure may permit reduction of a dimension of the enclosure.

Figure 16C:
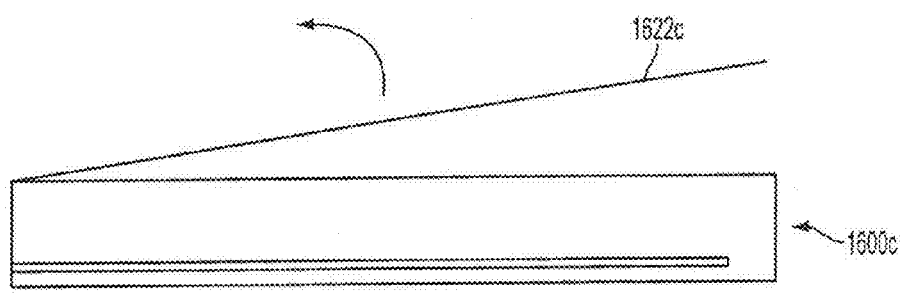

FIG. 16C depicts an enclosure 1600c identical to enclosure 1600a, except that enclosure 1600c includes a displaceable portion 1622c that may be displaced to open enclosure 1600c in order to accommodate transfer of objects from the exterior to enclosure 1600c or vice versa. Displaceable portion 1622c may be, e.g., a sliding lid or, as illustrated, a hinged lid that rotates open to allow access, as shown by the curved arrow in FIG. 16C. Displaceable portion 1622c may be partly or at least substantially conductive, and may or may not include a metamaterial. Displaceable portion 1622c may be configured in any other suitable way to perform its function, as has been described with respect to other displaceable portions illustrated in different figures herein.

Figure 16D:
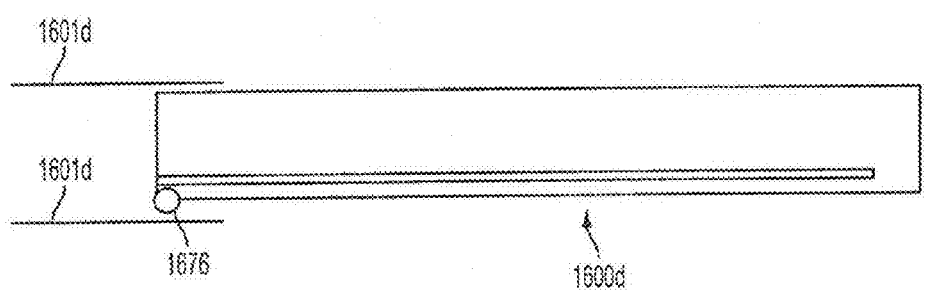

FIG. 16D depicts a folded enclosure in the form of a drawer which is housed in a cabinet. FIG. 16D depicts an enclosure 1600d, which is similar to enclosure 1600a except as follows. Enclosure 1600d is configured to roll out of a cabinet 1601d via a roller 1676, as illustrated, or tracks or the like. Alternate means of inserting and removing enclosure 1600d from cabinet 1601d may be employed.

Figure 16E:
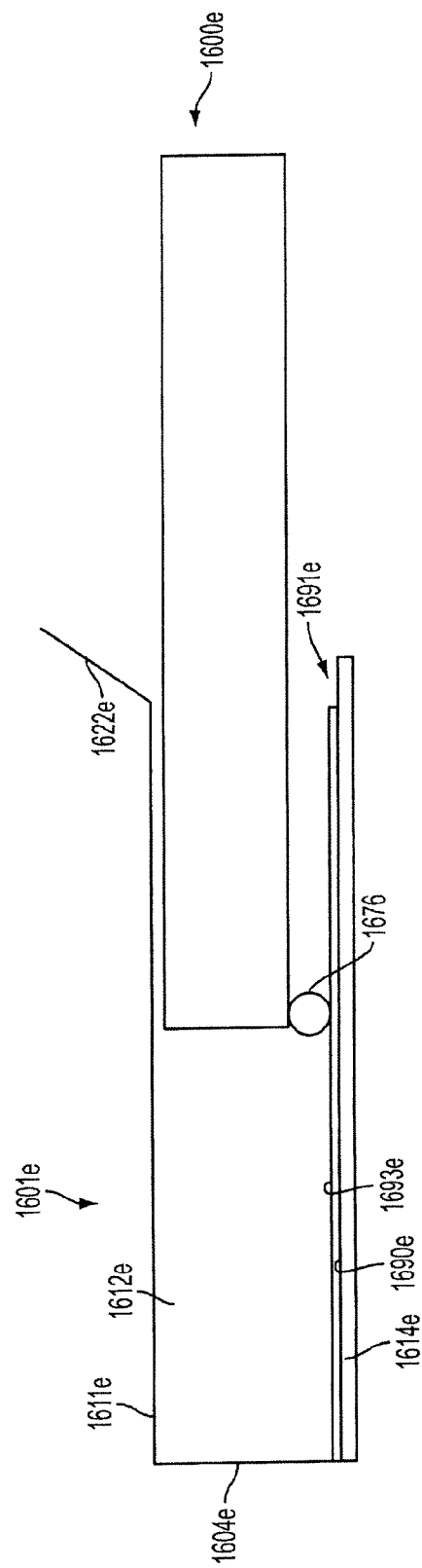

FIG. 16E depicts a folded enclosure in the form of a cabinet which houses a drawer. FIG. 16E illustrates an arrangement which differs notably from that illustrated in FIG. 16D in that, among other things, the cabinet 1601e, rather than the drawer 1600e, comprises the RFID folded enclosure.

As with the embodiment represented by FIG. 16D, drawer 1600e rolls out of cabinet 1601e via a roller 1676, or is removed from cabinet 1601e by some alternate means. Cabinet 1601e includes a displaceable portion 1622e for permitting drawer 1600e to be pushed in and out of cabinet 1601e. Displaceable portion 1622e may be a hinged lid, as shown, or any other displaceable portion, as discussed above.

Cabinet 1601e is an RFID-enabled enclosure and in this regard has an overall structure analogous to that of enclosure (drawer) 1600d (i.e., analogous to that of enclosure 1600a). Cabinet 1601e has a structure 1611e whose outer surface may be partly or at least substantially conductive. Cabinet 1601e has a longitudinal interior wall 1690e that divides the interior of cabinet 1601e into top section 1612e and bottom section 1614e. Interior wall 1690e extends from one end 1604e of cabinet 1601e almost to the other end of cabinet 1601e, which is formed by displaceable portion 1622e. A gap or aperture 1691e may be left between interior wall 1690e and one end of cabinet 1601e, to permit coupling of electromagnetic fields between top section 1612e and bottom section 1614e. As discussed elsewhere herein, a physical gap is not required to create an electromagnetic aperture. Aperture 1691e could be located, e.g., at the other end of cabinet 1601e rather than as illustrated. The top surface of interior wall 1690e may be covered with a conductive layer 1693e. Bottom section 1614e may be a solid volume or a partly or fully empty volume. Cabinet 1601e may include metamaterial portions. The more detailed description given above of the corresponding aspects and elements of the RFID enclosure constituted by drawer 1600d (i.e., enclosure 1600a) is applicable, mutatis mutandis, to cabinet 1601e.

Figure 16F:
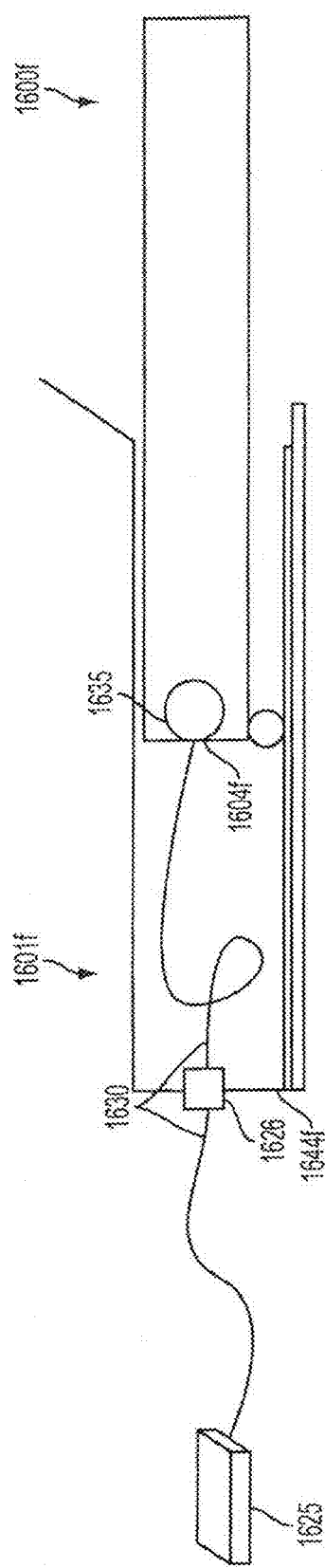

FIG. 16F illustrates an arrangement similar to that of FIG. 16E, but with additional components of an RFID system (e.g., RFID reader, transmission line, and feed) and with certain differences explained below.

As seen in FIG. 16F, RFID reader 1625 is connected to an RF transmission line 1630, which passes through a bulkhead feedthrough 1626 at end 1644f of cabinet 1601f. RF transmission line 1630 continues inside cabinet 1601f and attaches to a feed 1635 at end 1604f of drawer 1600f. Feed 1635 may be a feed in the form of a closed shape, such as a loop, as illustrated, or a feed probe or planar feed. Although a single RF transmission line 1630 and a single feed 1635 are illustrated, more than one may be provided.

The description given above of drawer 1600e and cabinet 1601e apply also to drawer 1600f and cabinet 1601f, with the following exception. It was stated above that the outer surface of cabinet 1601e may (but need not) be partly or at least substantially conductive and the inner surface of cabinet 1601e may (but need not) be partly or at least substantially conductive. Here, in embodiments represented by FIG. 16F, the inner and/or outer surfaces of either drawer 1600f or cabinet 1601f may (but need not) be partly or at least substantially conductive. RFID reader 1625 causes feed 1635 to generate an electromagnetic field in drawer 1600f and interrogates items in drawer 1600f.

Figure 16G:
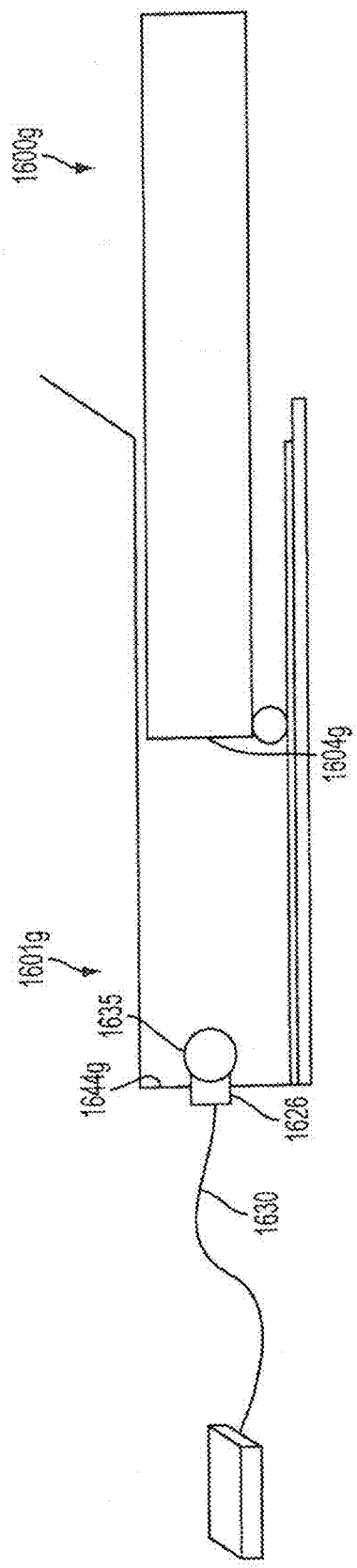

FIG. 16G illustrates an arrangement similar to that illustrated in FIG. 16F, but with a different arrangement of the RF transmission line and feed, and certain other differences. The arrangement of FIG. 16G differs from that of FIG. 16F as follows.

As seen in FIG. 16G, RF transmission line 1630 does not continue inside of cabinet 1601g, but rather, after going through bulkhead feedthrough 1626, attaches to a feed 1635 that is attached to the interior of end wall 1644g of cabinet 1601g. Feed 1635 may be configured in such a manner as not to physically interfere with drawer 1600g. This modified configuration of RF transmission line 1630 and feed 1635 may prevent the potential problem with regard to the arrangement of FIG. 16F that the portion of RF transmission line 1630 that is inside cabinet 1601f may become tangled behind drawer 1600f. As with the arrangement of FIG. 16F, RFID reader 1625 causes feed 1635 to generate an electromagnetic field in drawer 1600g and interrogates items in drawer 1600g.

The inner and/or outer surfaces of cabinet 1601g may (but need not) be partly or at least substantially conductive. In some embodiments, the end wall 1604g of drawer 1600g may be partly or at least substantially conductive and provided with one or more electromagnetic apertures to permit coupling between the interior of cabinet 1601g and drawer 1600g. Otherwise, the description given above of cabinet 1601f and drawer 1600f applies to cabinet 1601g and drawer 1600g.

Figure 16H:
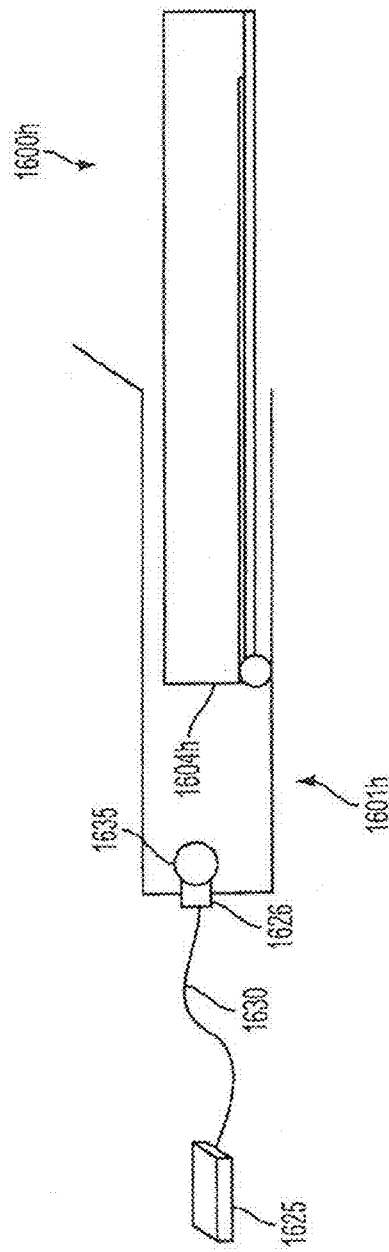
Figure 16I:
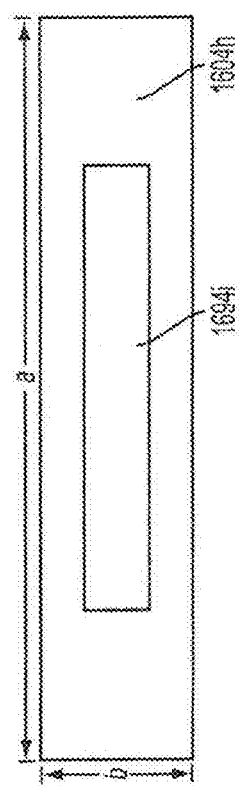

FIG. 16H depicts a cabinet housing a folded enclosure in the form of a drawer and depicts an RFID interrogator attached to an RF cable, which attaches to a feed loop attached to an end wall of the cabinet. FIG. 16I is an end view of the end wall of the cabinet of FIG. 16H. In FIG. 16I, a is the width of the end wall and b is the height of the end wall, with a and b representative of the same dimensions as in FIG. 16A.

The arrangement of FIG. 16H is similar to that of FIG. 16D, but additional components of an RFID system (e.g., RFID reader, transmission line, and feed) are included, and an aperture is provided in an end wall of the drawer. The distinctive features of the arrangement of FIG. 16H, as compared to that of FIG. 16D, will be explained below.

In the arrangement of FIG. 16H, RFID reader 1625, RF transmission line 1630, feed 1635 and bulkhead feedthrough 1626 are arranged in the same manner as in the arrangement of FIG. 16G. However, as seen in FIG. 16I, end wall 1604h may include an aperture 1694i. Aperture 1694i may permit feed 1635 to pass therethrough and be situated inside drawer 1600h. In some embodiments, aperture 1694i may allow for coupling of electromagnetic fields inside drawer 1600h and cabinet 1601h. In some embodiments, aperture 1694i may be both an electromagnetic aperture and a physical aperture, while in other embodiments aperture 1694i may be an electromagnetic aperture but not a physical aperture. Where aperture 1694i is not a physical aperture, it may be physically filled in with a dielectric material.

In the arrangement of FIG. 16H, the outer surface of either cabinet 1601h and/or drawer 1600h may be partly or at least substantially conductive. In particular, end wall 1604h of drawer 1600h may be formed of or include a material that is a conductive material and/or a metamaterial.

In operation, an electromagnetic field is generated within drawer 1600h and RFID tagged items in drawer 1600h are interrogated, the manner and details of which have been described above in similarly constructed enclosures.

The feed and aperture arrangement of FIG. 16H described above may be alternatively described as follows. Cabinet 1601h may be described as a container configured to contain the enclosure (i.e., drawer 1600h). At least one feed is attached to the container (i.e., cabinet 1601h). The enclosure (drawer 1600h) comprises an aperture aligned with the at least one feed, such that when the enclosure (drawer 1600h) is positioned within the container (cabinet 1601h) the at least one feed is disposed within the enclosure (drawer 1600h).

FIG. 16J depicts a cabinet housing a folded enclosure in the form of a drawer and depicts an RFID interrogator attached to an RF cable, which attaches to a planar feed attached to an end wall of the cabinet. The planar feed may be aligned with a non-conductive region of the drawer. Compressive RF gaskets may be attached to the end wall of the cabinet. FIG. 16K is a close-up partial view of the end wall of the cabinet and the end wall of the drawer where, in comparison to FIG. 16J, the drawer has been inserted farther into the cabinet such that the end wall of the drawer almost contacts the end wall of the cabinet. In what follows, the arrangement shown in FIGS. 16J and 16K will for convenience be referred to collectively as the arrangement of FIG. 16J.

The arrangement of FIG. 16J is similar to that of FIG. 16D, but additional components of an RFID system (e.g., RFID reader, transmission line, and feed), and a number of distinctive features, as outlined below, have been added. The points of difference between the arrangement of FIG. 16J, as compared to that of FIG. 16D, will now be explained.

In the arrangement of FIG. 16J, RFID reader 1625, RF transmission line 1630, feed 1634 and bulkhead feedthrough 1626 are arranged in the same manner as in the arrangement of the corresponding components of FIGS. 16G and 16H. However, in the arrangement of FIG. 16J, feed 1634 is a planar feed, as opposed to the feed loop shown in FIGS. 16G and 16H. Planar feed 1634 may be attached to the interior surface of end wall 1644*j* of cabinet 1601*j*.

As further seen in FIG. 16J, two compressive RF gaskets 1665 may be attached to the interior surface of end wall 1644*j* of cabinet 1601*j*. In some embodiments, the number of RF gaskets 1665 could be other than two. RF gaskets 1665 establish an RF bond with drawer 1600*j* when drawer 1600*j* is fully inserted into cabinet 1601*j*.

As seen in FIG. 16K (though not depicted in FIG. 16J), end wall 1604*j* of drawer 1600*j* may include a non-conductive region 1666 (indicated by the dashed line), which is preferably aligned with planar feed 1634. Non-conductive region 1666 may extend beyond the extent of planar feed 1634. In FIG. 16K, non-conductive region 1666 is shown as extending in the vertical direction beyond planar feed 1634. Non-conductive region 1666 may in an alternate arrangement extend less than the extent of planar feed 1634. For instance, in FIG. 16L, described below, non-conductive region 1666, indicated by the dashed line, is shown as having a smaller vertical extent than planar feed 1634. Aside from non-conductive region 1666, the outer and/or inner surface of drawer 1600*j* may (but need not) be partly or at least substantially conductive.

As for the operation of the arrangement of FIG. 16J, an electromagnetic field is generated within drawer 1600*j* and RFID tagged items in drawer 1600*j* are interrogated, the manner and details of which have been described previously for other embodiments of an enclosure.

In the feed and gasket arrangement of FIG. 16J, cabinet 1601*j* functions as a container configured to contain the enclosure (i.e., drawer 1600*j*). At least one feed is attached to the container (i.e., cabinet 1601*j*). At least one RF gasket is disposed to establish an RF bond between the at least one feed and the enclosure (drawer 1600*j*) when the enclosure is contained within the container (cabinet 1601*j*).

Figure 16L:
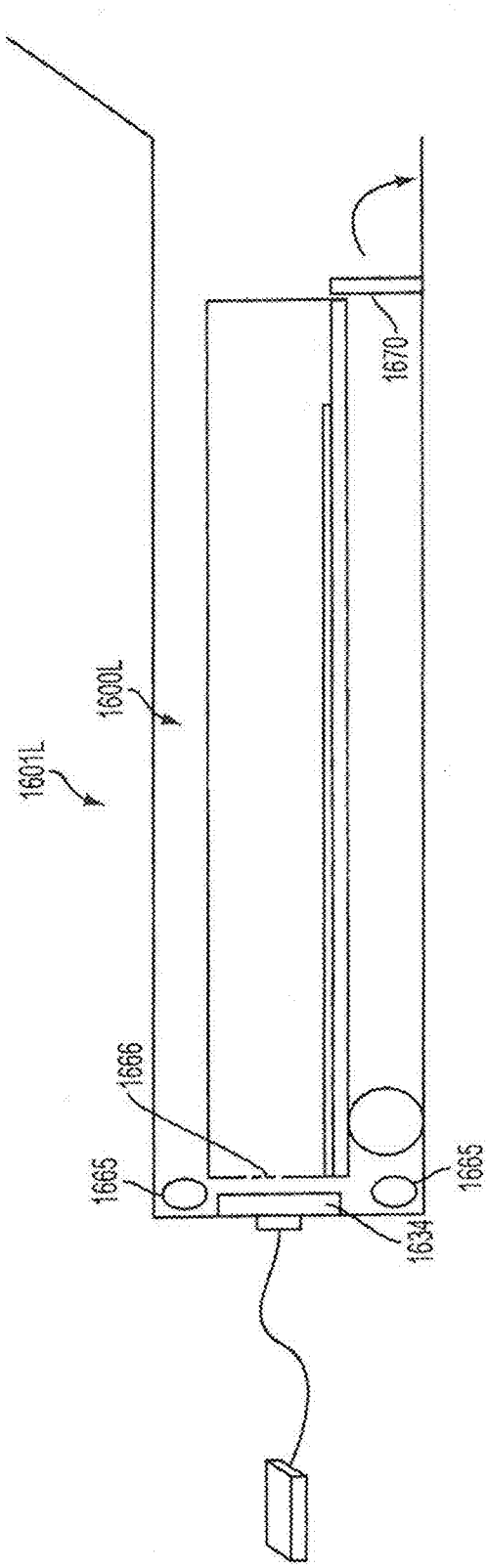

FIG. 16L depicts an arrangement similar to that of FIG. 16J, but with certain differences, which will be explained below.

The arrangement of FIG. 16L includes a drawer latch 1670 to provide or promote a compressive fit between drawer 1600L and compressive RF gaskets 1665. Latch 1670 may be mechanical, as illustrated in FIG. 16L (rotates downward upon release as shown by arrow), or magnetic, or of another type.

Cabinet 1601L may include one or more outer metamaterial portions that behave like a PMC.

With regard to embodiments discussed above, it has been noted that certain dimensions of the enclosure may be reduced under certain conditions, e.g., to one half or one quarter of a wavelength of the electromagnetic radiation. In another embodiment, such dimensions may also be increased to be much larger, e.g., up to 25 wavelengths of the electromagnetic radiation.

FIGS. 17A-17D illustrate graphs of impedance as a function of operating frequency (FIGS. 17A and 17C) and voltage standing wave ratio (VSWR) as a function of operating frequency (FIGS. 17B and 17D), for signals received from RFID sensors.

Figure 17A:
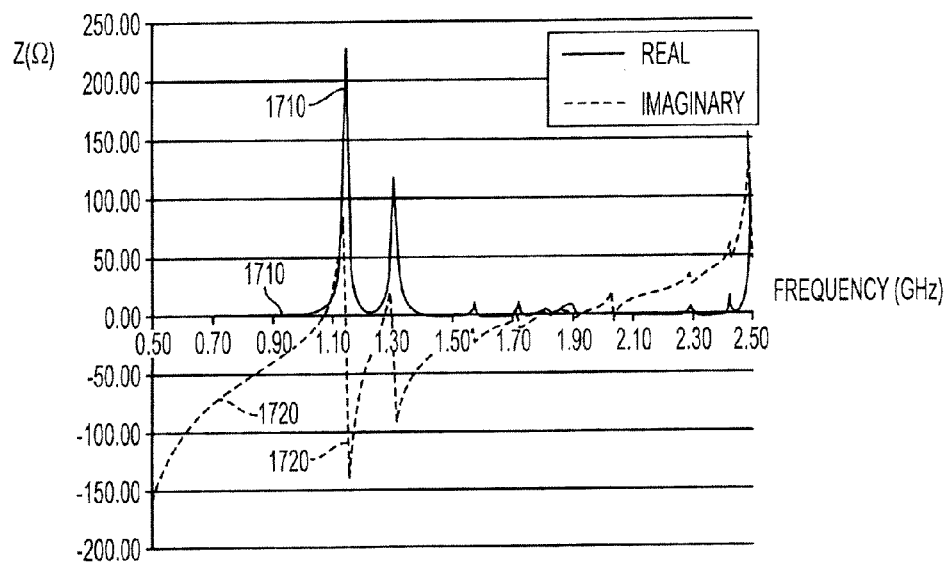
Figure 17B:
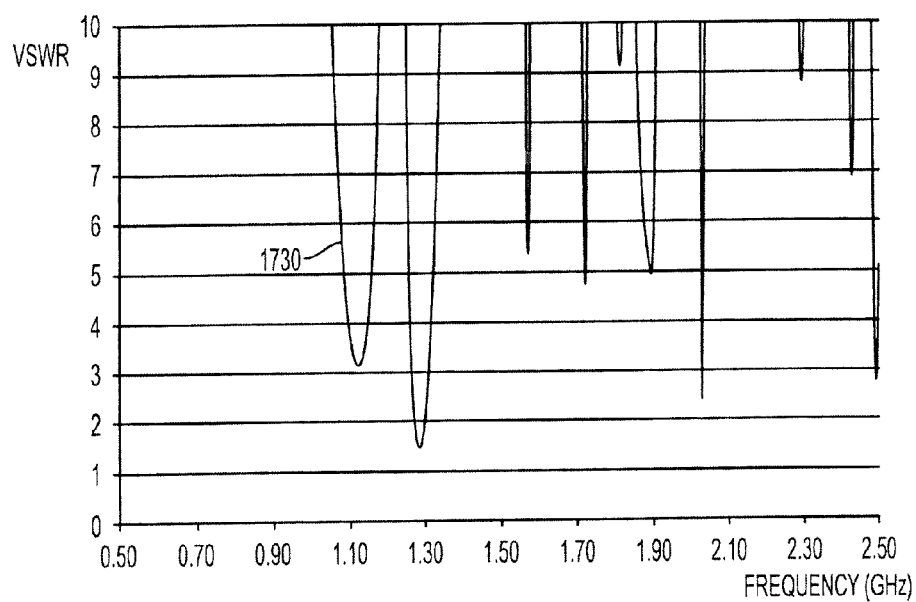
Figure 17C:
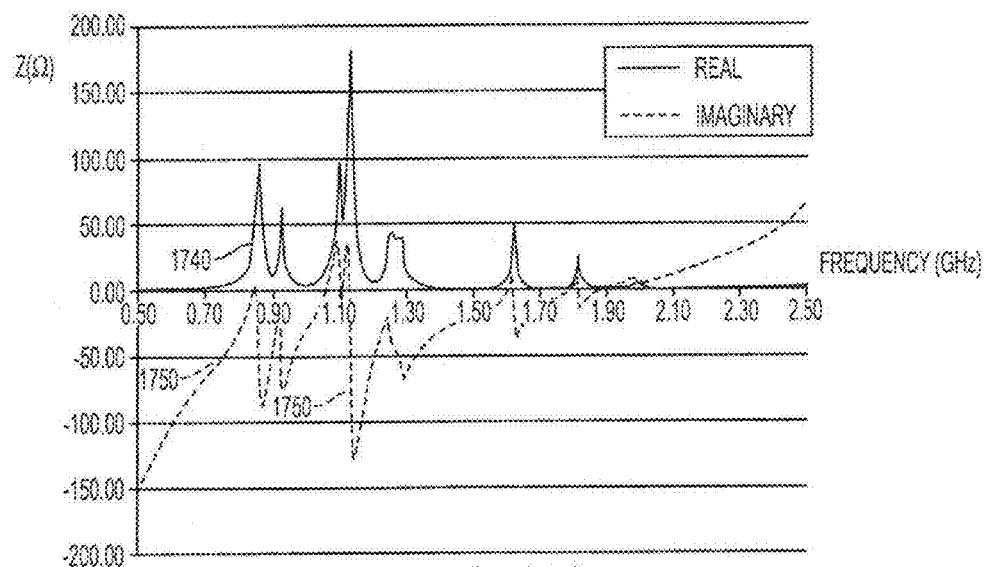
Figure 17D:
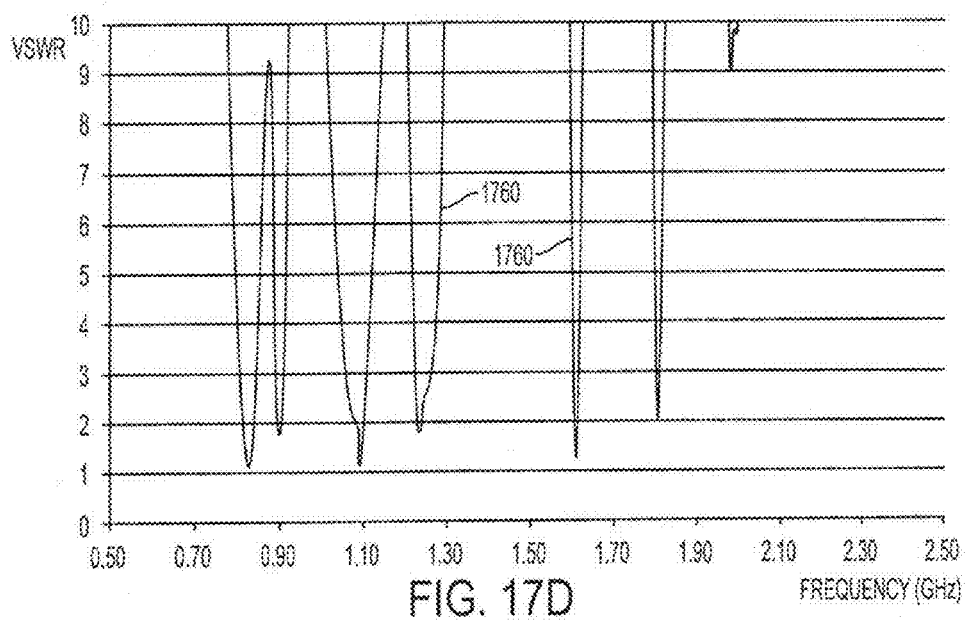

FIGS. 17A and 17B pertain to an unfolded enclosure of certain fixed (small) dimensions, while FIGS. 17C and 17D pertain to a folded enclosure of the same fixed dimensions. Thus, these figures illustrate how performance may be improved by folding an enclosure.

A voltage standing wave ratio (VSWR) is a ratio of the amplitude of the voltage of a partial standing wave at an antinode (maximum) to the amplitude of the voltage at an adjacent node (minimum).

It is assumed that the spectrum of operating frequencies is from 850 to 950 MHz.

The graph of FIG. 17A shows both the real component (resistance) 1710 and the imaginary component (reactance) 1720 of the impedance of signals received from the RFID sensors in the enclosure in response to the electric field generated by the RFID reader, as a function of the operating frequency. The graph of FIG. 17B shows VSWR 1730 of the signals received from the RFID sensors in the enclosure in response to the electric field generated by the RFID reader, as a function of the operating frequency. As seen in FIG. 17A, real impedance 1710 is essentially zero and imaginary impedance 1720 is comparatively large over the operating frequency bandwidth (850 to 950 MHz), which results in a poor impedance match, or a large VSWR, as can be seen in FIG. 17B.

In the graph of FIG. 17C, the real component is represented by reference numeral 1740 and the imaginary component by reference numeral 1750. In FIG. 17D, VSWR is represented by reference numeral 1760. Comparing FIGS. 17A and 17B with FIGS. 17C and 17D, it can be seen that a more effective response may be obtained from the RFID sensors in the folded enclosure (FIGS. 17C and 17D) than in the unfolded enclosure (FIGS. 17A and 17B). In FIG. 17C, the real component 1740 of the impedance in the operating band is non-zero, and the imaginary component 1750 is comparatively low. In FIG. 17D, the VSWR over the operating band is comparatively low. The graphs reflected in FIGS. 17C and 17D correlate with good performance in the interrogation of RFID sensors. With additional tuning measures, the performance may be still further improved.

Figure 18:
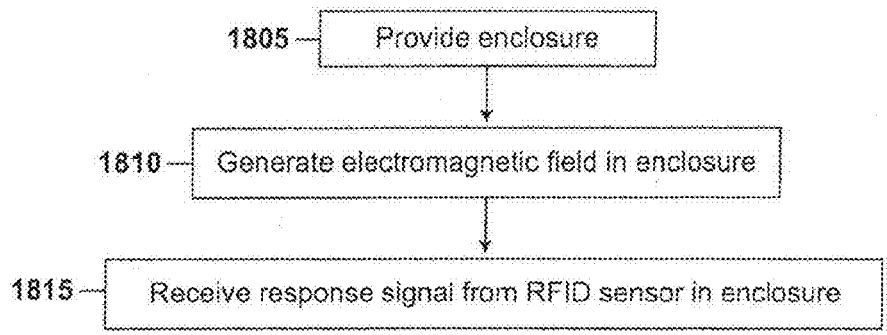
FIG. 18 is a flow chart illustrating a first method of performing RFID, in accordance with one or more embodiments of the present disclosure.

FIG. 18 is a flow chart illustrating methods of performing RFID, using enclosures, feeds and other elements described herein.

Method 1800 is a method for performing RFID. Because the steps of method 1800 are stated at a high level of generality, method 1800 may be considered to comprise multiple methods when explained at a greater level of specificity.

At step 1805, an enclosure is provided. The enclosure may comprise a partly or at least substantially closed structure defining a boundary between an interior region, interior to the structure, and an exterior of the structure, the structure having an inner surface facing the cavity and an outer surface facing the exterior. At least a part of the outer surface of the structure may (but need not) be conductive (to whatever extent), at least a part of the inner surface of the structure may (but need not) be conductive (to whatever extent), and at least a portion of the structure may (but need not) be formed of a metamaterial. At step 1810, an electromagnetic field may be generated in the interior region by at least one feed, in response to a first signal received from an RFID reader via at least one RF transmission line. The at least one feed may comprise at least one feed probe, planar feed, or feed in the form of a closed shape. At step 1815, a second signal, generated in response to the electromagnetic field by at least one RFID sensor located in the interior region, may be received by the at least one feed.

Method 1800 may include additional steps, not illustrated. For example, as additional steps, the second signal may be coupled from the at least one feed to the RFID reader via the at least one RF transmission line, in response to the second signal having been transmitted by the RFID sensor; and the coupled second signal may be analyzed. As another example, the following steps may be performed: the at least one RFID sensor may be attached to at least one item; information pertaining to the at least one item may be stored on the at least one RFID sensor; and the at least one item having the at least one RFID sensor attached thereto may be caused to be disposed in the interior region.

The providing step 1805 may be varied in that the enclosure may be varied. For example, instead of (or in addition to) at least a portion of the structure being formed of a metamaterial, the structure may include a wall extending within the interior region.

As another example, instead of (or in addition to) at least a portion of the structure being formed of a metamaterial, at least a portion of the structure may be formed of an electromagnetically absorbing material. In this case, the following additional steps may be included in method 1800: transporting at least one item (with the at least one RFID sensor attached to it) into the interior region, such as via a conveyer belt; and preventing the at least one item from entering a region near a portion of the inner surface of the structure, by means of a barrier.

Figure 19:
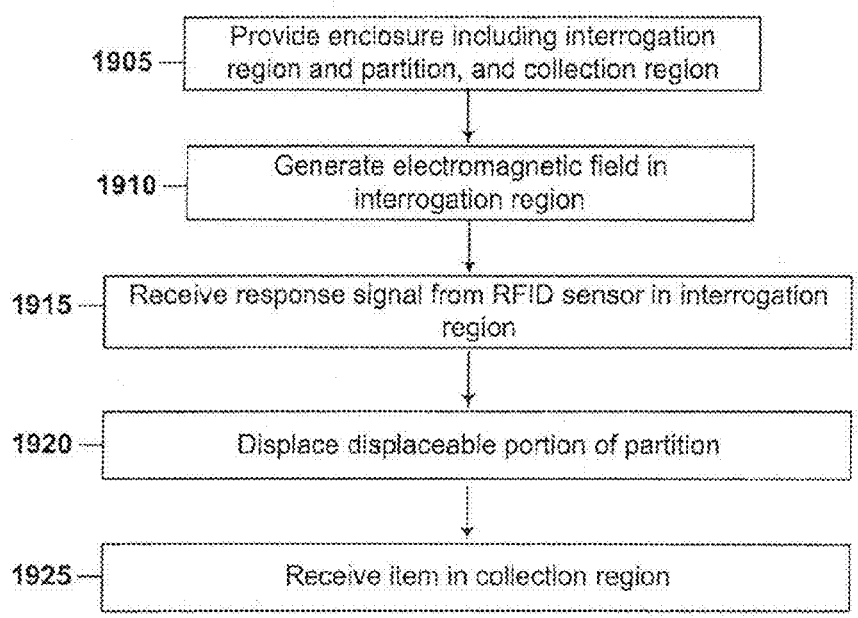
FIG. 19 is a flow chart illustrating a second method of performing RFID, in accordance with one or more embodiments of the present disclosure.

FIG. 19 is a flow chart illustrating methods of performing RFID, using enclosures, feeds and other elements described herein.

Method 1900 is a method for performing RFID. Because the steps of method 1900 are stated at a high level of generality, method 1900 may be considered to comprise multiple methods when explained at a greater level of specificity.

At step 1905, an enclosure is provided. The enclosure may comprise a partly or at least substantially closed structure defining a boundary between an interior region, interior to the structure, and an exterior of the structure, the structure having an inner surface facing the interior region and an outer surface facing the exterior. At least a portion of the outer and/or inner surface of the structure may (but need not) be partly or at least substantially conductive. The interior region may comprise an interrogation region for interrogation of an RFID sensor attached to an item within the interrogation region. The structure may include a partition defining a boundary between the interrogation region and an exterior of the interrogation region. At least a portion of the partition may be displaceable so as to permit the item to be transferred between the interrogation region and a collection region. The collection region is for receiving the item from the interrogation region, after the RFID sensor attached to the item has been interrogated. In step 1905, the collection region is also provided. At step 1910, an electromagnetic field may be generated in the interrogation region by at least one feed, in response to a first signal received from an RFID reader via at least one RF transmission line. The at least one feed may comprise at least one feed probe, planar feed, or feed in the form of a closed shape. At step 1915, a second signal, generated in response to the electromagnetic field by the RFID sensor attached to the item within the interrogation region, may be received by the at least one feed. At step 1920, the displaceable portion of the partition may be displaced. At step 1925, the item may be received in the collection region from the interrogation region, after the RFID sensor attached to the item has been interrogated.

Method 1900 may include additional steps that are not illustrated. For example, as an additional step, the item may be transferred from the exterior to the interrogation region. In this case, a portion of the structure may comprise a displaceable portion configured (1) for opening, so as to create an entry or opening between the structure and the exterior, and (2) for closing, so as to close the opening between the structure to the exterior, whereby the item may be transferred between the exterior and the interrogation region, via the opening.

As another example, as additional steps, the method may comprise determining whether an item is located in the interrogation region; and, in response to a determination that an item is located in the interrogation region, the at least one feed may be triggered to generate the electromagnetic field in the interrogation region.

As another example, as additional steps, the method may comprise the steps of: (1) determining whether the RFID sensor in the interrogation region has been successfully interrogated; and, (2) in response to a determination that the RFID sensor in the interrogation region has not been successfully interrogated, triggering a change in the electromagnetic field in the interrogation region.

As another example, as additional steps, the method may comprise: (1) coupling the second signal from the at least one feed to the RFID reader via the at least one RF transmission line, and (2) analyzing the coupled second signal. As another example, the following steps may be performed: the RFID sensor may be attached to the item; information pertaining to the item may be stored on the RFID sensor; and the item having the RFID sensor attached thereto may be caused to be disposed in the interrogation region.

In light of the principles and example embodiments described and illustrated herein, it will be recognized that the example embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference the possibilities of embodiments and are not intended to limit the invention to the particular configurations of embodiments described herein. As used herein, the terms may reference the same or different embodiments that are combinable into other embodiments. For example, as will be understood by one of ordinary skill in the art having benefit of this description, different kinds of structures (e.g., conductive, electromagnetically absorbing, metamaterial), different kinds of electromagnetic conditions, or other different aspects, which are located, established, or occur at various particular locations of an enclosure, structure, or the like, even if described with respect to a given embodiment or arrangement herein, may be employed in another embodiment or arrangement, although not explicitly mentioned.

Similarly, although example processes have been described with regard to particular operations performed in a particular sequence, numerous modifications could be applied to those processes to derive numerous alternative embodiments of the present disclosure. For example, alternative embodiments may include processes that use fewer than all of the disclosed operations, processes that use additional operations, and processes in which the individual operations disclosed herein are combined, subdivided, rearranged, or otherwise altered.

This disclosure also describes various benefits and advantages that may be provided by various embodiments. One, some, all, or different benefits or advantages may be provided by different embodiments. This disclosure also describes various applications that may be provided by various embodiments. As will be understood by one of ordinary skill in the art having the benefit of this description, different applications, even if described with respect to only one or more particular embodiments or arrangements herein, may nonetheless be employed in other embodiments and arrangements, although not explicitly mentioned. Further, not all applications of the instant disclosure have necessarily been included herein, and one of ordinary skill in the art, having benefit of this description, will readily appreciate that the disclosure may lend itself to other applications.

In view of the wide variety of useful permutations that may be readily derived from the example embodiments described herein, this detailed description is intended to be illustrative only and should not be taken as limiting the scope of the invention. What is claimed as the invention, therefore, are all implementations that come within the scope of the following claims and all equivalents to such implementations.

What is claimed is:

1. A radio frequency identification (RFID) system, comprising:
   an enclosure comprising an at least partly closed structure defining a boundary between an interior region, interior to the structure, and an exterior of the structure, the structure having an inner surface facing the interior region and an outer surface facing the exterior;
   at least one feed configured for (1) generating an electromagnetic field in the interior region in response to a first signal received from an RFID reader via at least one radio frequency (RF) transmission line, and (2) receiving, from at least one RFID sensor located in the interior region, a second signal generated in response to the electromagnetic field; and
   a container configured to contain the enclosure, wherein the at least one feed is attached to the container,
   wherein at least a part of the outer surface is conductive or at least a portion of the inner surface is conductive,
   wherein the structure includes a wall extending within the interior region, the wall having two longitudinal sides and extending from a first portion of the inner surface of the structure across the interior region to or toward a second portion of the inner surface of the structure, with an electromagnetic aperture provided in the wall, so as to divide the interior region into two subregions on either longitudinal side of the wall, the two subregions configured for coupling with each other upon generation of the electromagnetic field in the interior region, and
   wherein the enclosure comprises an aperture aligned with the at least one feed, such that when the enclosure is positioned within the container the at least one feed is disposed within the enclosure.

2. The system of claim 1, wherein the second signal is coupled from the at least one feed to the RFID reader, via the at least one RF transmission line, the system further comprising:
   the RFID reader,
   the at least one RF transmission line; and
   a processor configured for (1) communicating with the RFID reader, and (2) analyzing the second signal that has been coupled from the at least one feed to the RFID reader, via the at least one RF transmission line.

3. The system of claim 1, wherein the second signal contains information pertaining to a particular RFID sensor that generated the second signal.

4. The system of claim 1,
   wherein at least a portion of the structure is formed of a metamaterial, and
   wherein the portion of the structure formed of a metamaterial is configured to prevent a short circuit boundary condition on at least a portion of the inner surface of the structure.

5. The system of claim 1,
   wherein at least a portion of the structure is formed of a metamaterial, and
   wherein the portion of the structure formed of a metamaterial is configured to establish an open circuit boundary condition on a portion of the inner surface of the structure.

6. The system of claim 1,
   wherein at least a portion of the structure is formed of a metamaterial, and
   wherein the portion of the structure formed of a metamaterial is configured to establish a generalized impedance boundary condition on a portion of the inner surface of the structure.

7. The system of claim 1, wherein a lateral dimension of the interior region is within a range of about one-quarter of a wavelength to about 25 wavelengths of the electromagnetic field.

8. The system of claim 1, wherein at least one of the two subregions contains a dielectric material.

9. The system of claim 1, wherein the at least one feed comprises at least one feed probe, planar feed, or feed in the form of a closed shape.

10. The system of claim 1,
    wherein the enclosure comprises a second container configured for containing items, and
    wherein the structure comprises a displaceable portion configured (1) for opening, so as to create an opening between the structure and the exterior, and (2) for closing, so as to close the opening between the structure and the exterior,
    whereby an item may be transferred between the exterior and the second container, via the opening.

11. The system of claim 1, wherein the enclosure comprises a waveguide.

12. The system of claim 1, wherein the enclosure comprises a cavity.

13. The system of claim 1,
    wherein the structure comprises at least one end portion, and wherein at least a portion of the structure at or near the at least one end portion is formed of an electromagnetically absorbing material.

14. The system of claim 1, further comprising:
at least one RF gasket disposed to establish an RF bond between the at least one feed and the enclosure when the enclosure is contained within the container.

15. A radio frequency identification (RFID) system, comprising:
an enclosure comprising an at least partly closed structure defining a boundary between an interior region, interior to the structure, and an exterior of the structure, the structure having an inner surface facing the interior region and an outer surface facing the exterior,
at least one feed configured for (1) generating an electromagnetic field in the interior region in response to a first signal received from an RFID reader via at least one radio frequency (RF) transmission line, and (2) receiving, from at least one RFID sensor located in the interior region, a second signal generated in response to the electromagnetic field;
a container configured to contain the enclosure, wherein the at least one feed is attached to the container; and
at least one RF gasket disposed to establish an RF bond between the at least one feed and the enclosure when the enclosure is contained within the container,
wherein at least a part of the outer surface is conductive or at least a portion of the inner surface is conductive, and
wherein the structure includes a wall extending within the interior region, the wall having two longitudinal sides and extending from a first portion of the inner surface of the structure across the interior region to or toward a second portion of the inner surface of the structure, with an electromagnetic aperture provided in the wall, so as to divide the interior region into two subregions on either longitudinal side of the wall, the two subregions configured for coupling with each other upon generation of the electromagnetic field in the interior region.

16. The system of claim 15, wherein the second signal is coupled from the at least one feed to the RFID reader, via the at least one RF transmission line, the system further comprising:
the RFID reader;
the at least one RF transmission line; and
a processor configured for (1) communicating with the RFID reader, and (2) analyzing the second signal that has been coupled from the at least one feed to the RFID reader, via the at least one RF transmission line.

17. The system of claim 15, wherein a lateral dimension of the interior region is within a range of about one-quarter of a wavelength to about 25 wavelengths of the electromagnetic field.

18. The system of claim 15, wherein at least one of the two subregions contains a dielectric material.

19. The system of claim 15, wherein the at least one feed comprises at least one feed probe, planar feed, or feed in the form of a closed shape.

20. The system of claim 15,
wherein the enclosure comprises a second container configured for containing items, and
wherein the structure comprises a displaceable portion configured (1) for opening, so as to create an opening between the structure and the exterior, and (2) for closing, so as to close the opening between the structure and the exterior,
whereby an item may be transferred between the exterior and the second container, via the opening.

* * * * *